United States Patent
Ruopp

(10) Patent No.: US 11,472,391 B2
(45) Date of Patent: Oct. 18, 2022

(54) HYDRAULIC MASTER DEVICE FOR A HYDRAULIC BRAKE OR CLUTCH OF HANDLE-BAR GUIDES VEHICLES AND HYDRAULIC BRAKE OF A HANDLE-BAR GUIDES VEHICLE

(71) Applicant: Gustav Magenwirth GmbH & Co. KG, Bad Urach (DE)

(72) Inventor: Michael Ruopp, Berghülen (DE)

(73) Assignee: Gustav Magenwirth GMBH & CO. KG, Bad Urach (DE)

( * ) Notice: Subject to any disclaimer, the term of this patent is extended or adjusted under 35 U.S.C. 154(b) by 319 days.

(21) Appl. No.: 16/181,873

(22) Filed: Nov. 6, 2018

(65) Prior Publication Data

US 2019/0152457 A1 May 23, 2019

(30) Foreign Application Priority Data

Nov. 6, 2017 (DE) .................. 10 2017 219 666.1

(51) Int. Cl.
*B62L 3/02* (2006.01)
*B60T 11/16* (2006.01)
(Continued)

(52) U.S. Cl.
CPC ............. *B60T 11/165* (2013.01); *B60T 7/102* (2013.01); *B60T 11/18* (2013.01); *B60T 11/22* (2013.01);
(Continued)

(58) Field of Classification Search
CPC ......... B62L 3/023; B62K 23/06; B60T 7/102; B60T 11/16; B60T 11/18; B60T 11/102;
(Continued)

(56) References Cited

U.S. PATENT DOCUMENTS 4,501,340 A 2/1985 Yoshida
6,484,855 B1 * 11/2002 Yaple ...................... B62L 3/023
180/219

(Continued)

FOREIGN PATENT DOCUMENTS

CN 204399153 U 6/2015
CN 105073572 A 11/2015
(Continued)

OTHER PUBLICATIONS

European Search Report for European Patent App. No. 18204570.8 dated Apr. 15, 2019.

(Continued)

*Primary Examiner* — Robert A. Siconolfi
*Assistant Examiner* — Stephen M Bowes
(74) *Attorney, Agent, or Firm* — Gregory L. Mayback; Dickinson Wright PLLC

(57) ABSTRACT

A hydraulic master apparatus for a hydraulic brake or clutch of handlebar-guided vehicles having a handlebar tube includes a support, a lever pivotally connected to the support, a hydraulic cylinder sized to fit in the handlebar tube and having a piston, and a pulling device configured to exert a pulling force on the piston when the lever is actuated. The apparatus also includes a grip width adjusting apparatus, by which a distance between the support for the lever and the hydraulic cylinder is adjusted to adjust a grip width. Also included is a cover that, responsive to being connected in the handlebar tube, defines with the hydraulic cylinder in the handlebar tube a compensating chamber therebetween.

18 Claims, 16 Drawing Sheets

(51) Int. Cl.
    *B60T 11/18* (2006.01)
    *B60T 7/10* (2006.01)
    *B60T 11/22* (2006.01)
    *B62K 21/16* (2006.01)
    *B62M 25/08* (2006.01)
(52) U.S. Cl.
    CPC .............. *B62K 21/16* (2013.01); *B62L 3/023* (2013.01); *B62M 25/08* (2013.01)
(58) Field of Classification Search
    CPC .................. B60T 11/103; B60T 11/165; F16D 2125/645; F15B 7/08
    See application file for complete search history.

(56) References Cited

U.S. PATENT DOCUMENTS

| | | | |
|---|---|---|---|
| 6,502,675 B1 | 1/2003 | Andrus | |
| 7,249,661 B2 | 7/2007 | Becocci et al. | |
| 8,151,666 B1 | 4/2012 | Kraus | |
| 9,630,677 B2 | 4/2017 | Jordan et al. | |
| 2005/0056011 A1* | 3/2005 | Idei | B60T 11/16 60/533 |
| 2007/0251780 A1 | 11/2007 | Lyons | |
| 2009/0152063 A1 | 6/2009 | Tsai | |
| 2011/0162929 A1 | 7/2011 | Moore | |
| 2012/0152673 A1 | 6/2012 | Wang | |
| 2013/0333994 A1* | 12/2013 | Jordan | B62L 3/023 188/344 |
| 2015/0266540 A1* | 9/2015 | Snead | B62L 3/023 188/344 |
| 2016/0327070 A1* | 11/2016 | Fujiwara | B62M 25/04 |
| 2019/0061870 A1* | 2/2019 | Sakai | B60T 11/16 |
| 2020/0146908 A1* | 5/2020 | Harrison | A61G 5/1035 |

FOREIGN PATENT DOCUMENTS

| | | | | |
|---|---|---|---|---|
| CN | 105460132 A | 4/2016 | | |
| DE | 3706545 A1 | 9/1988 | | |
| DE | 102010053009 A1 | 6/2012 | | |
| DE | 102013009904 A1 | 12/2013 | | |
| DE | 102014007717 B3 | 9/2015 | | |
| DE | 102015010839 A1 | 8/2016 | | |
| DE | 102015010858 A1 | 8/2016 | | |
| DE | 102017202842 A1 | 8/2017 | | |
| DE | 102016119666.5 A1 | 4/2018 | | |
| EP | 0875443 A2 * | 11/1998 | ............ | B62K 23/06 |
| EP | 0875443 A2 | 11/1998 | | |
| EP | 1449759 B1 | 6/2006 | | |
| EP | 1714734 B1 | 10/2006 | | |
| EP | 2460717 A1 | 6/2012 | | |
| EP | 2468618 A1 | 6/2012 | | |
| EP | 1595781 A1 | 11/2014 | | |
| EP | 2857268 A1 | 4/2015 | | |
| EP | 2985198 A1 | 2/2016 | | |
| EP | 3018049 A1 | 5/2016 | | |
| FR | 960276 A | 4/1950 | | |
| GB | 800196 A | 8/1958 | | |
| JP | H09226661 A | 9/1997 | | |
| TW | 201615479 A | 5/2016 | | |
| WO | 2004012956 A1 | 2/2004 | | |

OTHER PUBLICATIONS

European Office Action for EU App. No. 18 204 570.8 dated Jun. 17, 2022.
Taiwan Office Action for TW App. No. 11120490750 dated May 18, 2022.

* cited by examiner

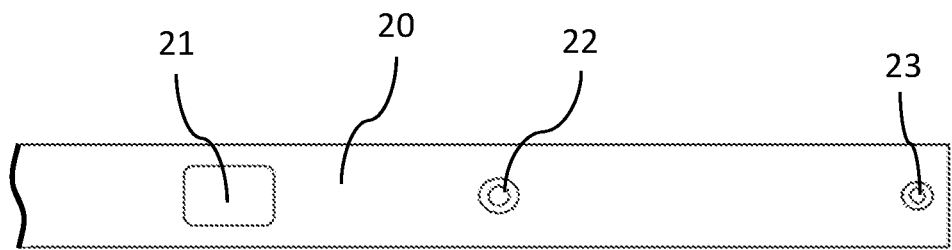
Fig. 3
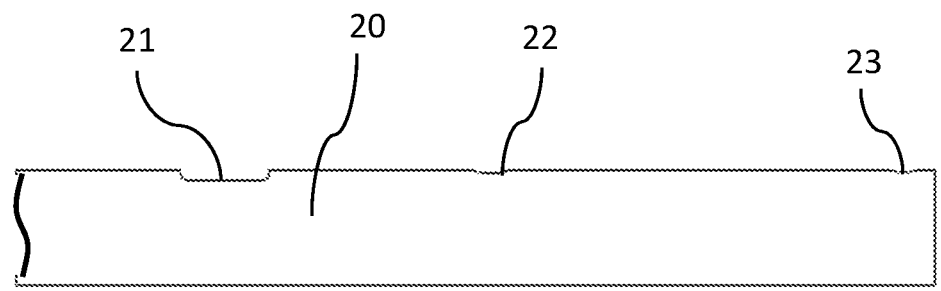
Fig. 4
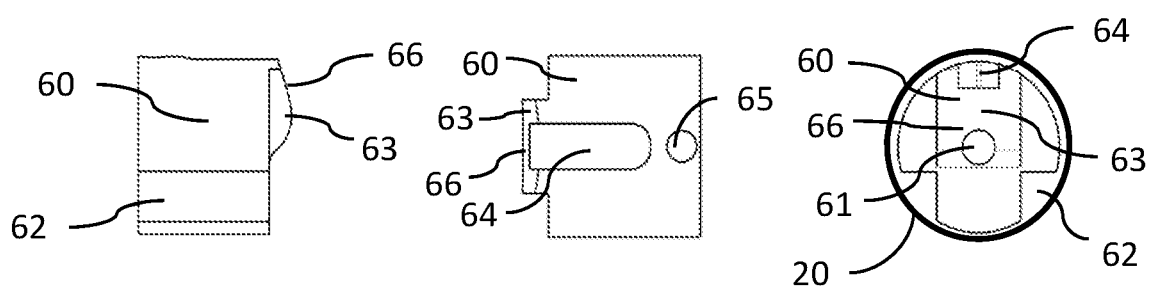
Fig. 5     Fig. 6     Fig. 7
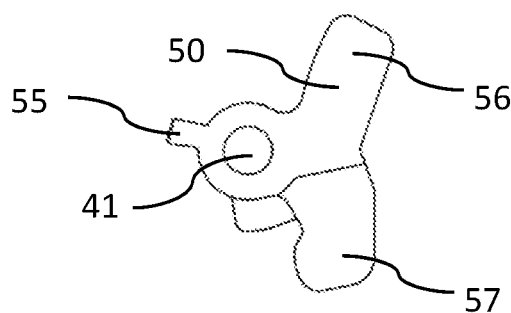 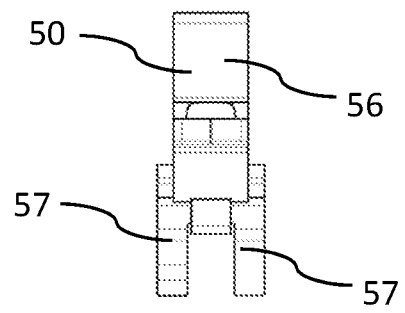
Fig. 8     Fig. 9

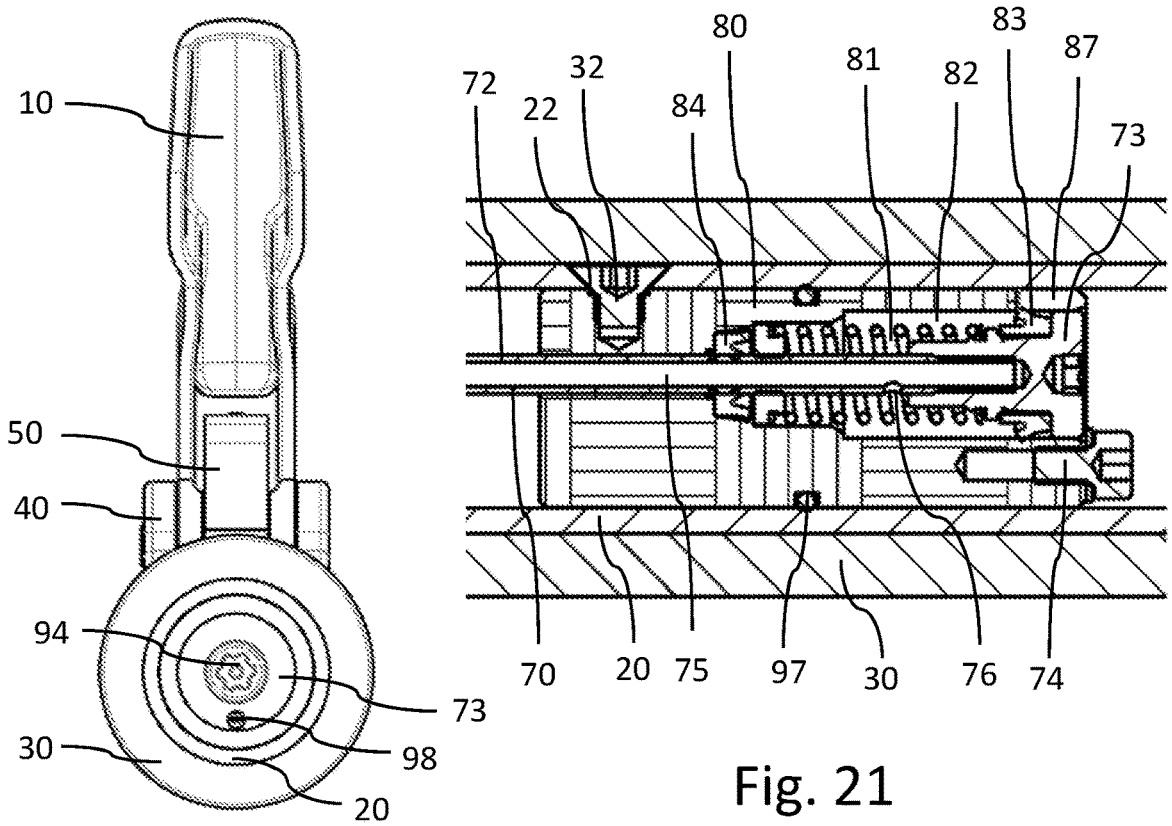
Fig. 21
Fig. 20
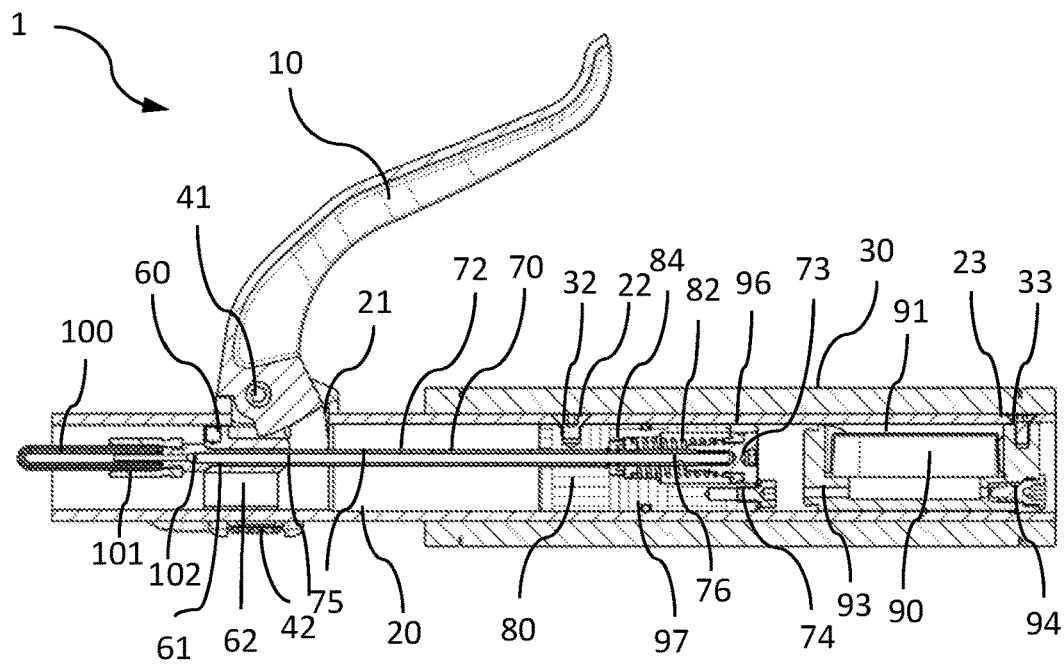
Fig. 22

HYDRAULIC MASTER DEVICE FOR A HYDRAULIC BRAKE OR CLUTCH OF HANDLE-BAR GUIDES VEHICLES AND HYDRAULIC BRAKE OF A HANDLE-BAR GUIDES VEHICLE

CROSS-REFERENCE TO RELATED APPLICATIONS

This application claims the priority, under 35 U.S.C. § 119, 120, 172, 363, 365, and 371. of German Patent Application No. 10 2017 219 666.1, filed Nov. 6, 2017; the prior application is herewith incorporated by reference in its entirety.

STATEMENT REGARDING FEDERALLY SPONSORED RESEARCH OR DEVELOPMENT

Not Applicable

FIELD OF THE INVENTION

The present systems, apparatuses, and methods lie in the field of vehicle brakes. The present disclosure relates to a hydraulic master apparatus for a hydraulic brake or clutch of a handlebar-guided vehicle and a hydraulic brake of a handlebar-guided vehicle that can be easily mounted on standard handlebar tubes with bends towards the center of the vehicle.

BACKGROUND OF THE INVENTION

The invention relates to a hydraulic master apparatus for a hydraulic brake or clutch of a handlebar-guided vehicle according to the preamble of claim 1 and a hydraulic brake of a handlebar-guided vehicle.

GB 800,196 A discloses a hydraulic master apparatus which is arranged in a handlebar tube. This known hydraulic master apparatus is used for a closed system without compensating container and has a relatively complex design. A pressure cylinder is arranged in the hydraulic cylinder. The pressure rod is actuated by a deflection which is guided around the cylinder and which is actuated by the lever. This design is very space-intensive and not suitable for open systems having a compensating container.

DE 10 2015 010 839 A1 and DE 10 2015 010 858 A1 disclose hydraulic master apparatuses for a special handlebar geometry, which have a handlebar tube that is guided forward. At the open end of the handlebar tube, the hydraulic master apparatus protrudes forward from the handlebar tube and is also arranged around the handlebar tube. These known hydraulic master apparatuses are not suitable for mounting on handlebars that run transversely to the longitudinal axis of the vehicle, such as those used on trekking bikes, mountain bikes or most electric bicycles.

U.S. Pat. No. 6,502,675 B1 discloses hydraulic master apparatuses for a hydraulic brake of a handlebar-guided vehicle, where the master cylinder is arranged in the handlebar tube.

The hydraulic master apparatuses known from U.S. Pat. No. 6,502,675 B1 have the disadvantage that the master cylinders are arranged in the handlebar tube in the direction of the vehicle center seen from the lever. This is where the handlebar tube usually has bends. This means that only a very limited installation space is available and installation is cumbersome and difficult if the conventional curved handlebar tubes shall be used.

SUMMARY OF THE INVENTION

According to the invention, a hydraulic master apparatus for a hydraulic brake or clutch of handlebar-guided vehicles is provided with a lever pivotally mounted in a support and a hydraulic cylinder which can be arranged in a handlebar tube of the handlebar-guided vehicle, the hydraulic master apparatus comprising a pulling device which, when the hydraulic master apparatus is actuated, exerts a pulling force on the piston of the hydraulic cylinder.

The invention has the advantage that, due to the exemplary embodiment, sufficient installation space is available because the master cylinder can be arranged from the lever to the vehicle side, e.g., in the straight area of the handle tube.

According to the invention, the pulling device can comprise a pull rod. The pull rod can also be the piston rod for the piston of the hydraulic master apparatus. Due to the double function of the pull rod, a compact and simple design can be achieved.

According to the invention, the piston rod can run through the pressure chamber. This has the advantage of a compact and simple design.

According to the invention, a hydraulic channel can be arranged in the pulling device from the hydraulic cylinder to the hydraulic line which is connected to the associated hydraulic slave apparatus.

According to the invention, the hydraulic channel can be arranged in the pull rod. This design has the advantage that very little space is required due to the double function of the pull bar.

According to the invention, the hydraulic master apparatus can have a shifting device which is arranged in the handlebar tube of the handlebar-guided vehicle in such a way that it can be moved in the longitudinal direction of the handlebar tube.

According to the invention, the shifting device can be connected to the pulling device.

According to the invention, the lever can be hinged to two axes of rotation, which are engaged by two arms pivotally arranged on the lever. This design has the advantage that when the pivot point is low, the increase in the transmission ratio can be somewhat lower.

According to the invention, one arm can be part of a pressure piece.

According to the invention, the pulling device can have an anti-turn system, which prevents or restricts the rotation in the handlebar tube. The anti-turn system can here include an alignment device between the shifting device and a pressure piece that transmits the force from the lever to the shifting device. For example, the shifting device can include a groove which is engaged by fork legs or two extensions of the pressure piece. In the case of designs without the pressure piece, the lever can also engage accordingly directly on the shifting device. Alternatively or additionally, the shifting device can also comprise two webs between which a web of the pressure piece or lever engages.

An anti-turn system is advantageous because the hydraulic line might possibly exert a torque on the hydraulic master apparatus because the hydraulic line might have been arranged on a reel before the assembly and, therefore, has a twist.

According to the invention, the shifting device can have a contour in order to achieve a decreasing transmission ratio preferably with increasing actuation of the hydraulic master apparatus. For these designs of the invention, it is advantageous to provide an anti-turn system for the shifting device.

According to the invention, the hydraulic master apparatus can be equipped with a grip width adjusting apparatus, by means of which the distance between the support for the lever and the master cylinder can be adjusted in order to adjust the grip width.

Therefore, according to the invention, a hydraulic master apparatus for a hydraulic brake or clutch of handlebar-guided vehicles is also provided with a lever which is pivotably arranged in a support and a hydraulic cylinder which can be arranged in a handlebar tube of the handlebar-guided vehicle, the hydraulic master apparatus having a grip width adjusting device with which the distance between the support for the lever and the master cylinder can be adjusted in order to adjust the grip width.

According to the invention, the support can be arranged on the handlebar tube in a movable fashion.

According to the invention, the master cylinder can be arranged in the handlebar tube in a movable fashion.

According to the invention, the master cylinder can be fastened to the handlebar tube by means of a fastening member. The fastening member can be a screw. An elongated hole can be formed in the handlebar tube. The elongated hole can have an edge with contours or a grating so that the fastening member can only be tightened in certain positions.

According to the invention, the hydraulic master apparatus can have a pulling device which exerts a pulling force on the piston of the hydraulic cylinder when the hydraulic master apparatus is actuated and can have a shifting device which is arranged in the handlebar tube of the handlebar-guided vehicle so as to be movable in the longitudinal direction of the handlebar tube, the shifting device being connected to the pulling device. The length of the pulling device can be adjustable.

According to the invention, the pulling device can have a pull rod.

According to the invention, the length of the pull rod can be adjustable. Alternatively or additionally, the point of application of the pulling device on the shifting device and/or on the master cylinder can be adjustable according to the invention.

For example, the shifting device and the pulling device or the pulling device and the master cylinder can be connected via a screw connection. This has the advantage that the point of application can be easily shifted or adjusted by turning the pulling device or a screw of the screw connection.

According to the invention, the pulling device can have a pull rod which is connected to the shifting device via a screw.

According to the invention, the hydraulic master apparatus can have a compensating chamber arranged in the handlebar tube.

Therefore, a hydraulic master apparatus for a hydraulic brake or clutch of handlebar-guided vehicles comprises, according to the invention, a lever, which is pivotally arranged in a support, and a hydraulic cylinder, which can be arranged in a handlebar tube of the handlebar-guided vehicle, the hydraulic master apparatus having a compensating chamber arranged in the handlebar tube.

According to the invention, the master cylinder can be arranged between the support for the lever and the compensating chamber.

According to the invention, the master cylinder can have an extension, in which the compensating chamber is arranged.

According to the invention, the lever support can be arranged on the outside of the handlebar tube. Here, the lever can be directed towards the center of the vehicle.

According to the invention, the piston of the master cylinder can have an extension which extends into the compensating chamber. A hydraulic channel can be arranged in the extension of the piston.

According to the invention, the hydraulic channel can be connected to the pressure chamber in the master cylinder.

According to the invention, the hydraulic channel can run through the compensating chamber.

According to the invention, the compensating chamber can be arranged on the outside of the handlebar tube.

According to the invention, the support for the vent screw can have a Luer cone for receiving a commercially available syringe.

According to the invention, the hydraulic master apparatus can have a sensor for detecting the position of the lever. Here, the position of the lever can be used to actuate a brake light. Furthermore, in vehicles with an electric drive, the position of the lever can be used to control recuperation.

According to the invention, the hydraulic master apparatus can have an indicator which indicates the filling level in the compensating chamber. The indicator can here be hydraulically connected to the compensating chamber.

According to the invention, the indicator can be arranged in the grip area of the handlebar.

According to the invention, the indicator can be provided at the end of the handlebar tube. For this purpose, the compensating housing can preferably be made of two parts, so that an indicator section can advantageously be made transparent.

Alternatively or additionally, the indicator can include a sensor for detecting the filling level in the compensating chamber and elements to control the indicator. The sensor device can here comprise a magnet which is arranged on the bellows and interacts with a sensor which can be provided, for example, on the wall of the compensating housing and/or of the master cylinder in the region of the compensating housing.

According to the invention, the hydraulic master apparatus can be completely integrated or accommodated in the handlebar tube, except for the operating lever.

According to the invention, the handlebar tube of the handlebar-guided vehicle can extend transversely to the direction of the vehicle. In other words, the handlebar tube can be designed and arranged in such a way that the ends of the handlebar tube are arranged on both sides of the vehicle. According to the invention, the hydraulic master apparatus can be arranged, at one end of the handlebar tube, or a pair of hydraulic master apparatuses (e.g., for a front wheel brake and a rear wheel brake) can be arranged on both handlebar ends which are located on opposite sides of the vehicle (e.g., left and right in the direction of travel).

According to the invention, a hydraulic brake or hydraulic clutch or hydraulic bicycle brake is also provided, the hydraulic brake or hydraulic clutch or hydraulic bicycle brake having a hydraulic master apparatus according to the invention.

According to the invention, the hydraulic bicycle brake can be a disk brake or a rim brake.

The invention is described below by means of the embodiments shown in the drawings. The following reference signs are used:

1 master apparatus
10 lever
11 arm section 20 handlebar tube
21 opening
22 opening
23 opening
30 handle tube
32 screw
33 screw
40 support
41 axis of rotation
41A axis of rotation
41B axis of rotation
42 clamp
43 adapter for switch unit
44 grip width adjusting device
45 tab
46 screw
50 pressure piece
50A pressure piece section
50B pressure piece
51A arm
51B arm section
53 axis of rotation
54 axis of rotation
55 projection
56 extension
57 extension
60 shifting device
61 passage
62 passage
63 web
64 groove
65 support
66 contour
70 pulling device
71 head
72 main body
73 screw connection
731 connecting piece
74 screw
75 hydraulic channel
76 opening
80 master cylinder
81 return spring
82 pressure chamber
83 primary seal
84 seal
85 pressure line
86 extension
90 compensating chamber
91 bellows
911 bead
92 cover
93 passage
94 vent screw
95 cone
96 overflow channel
97 seal
98 vent hole
100 hydraulic line
101 clamping screw
102 connecting piece
110 frame
111 flattening
120 compensating housing
121 flattening
122 snap device
123 snap device
124 front wall
125 front wail
126 web
130 sensor device
131 magnet
132 Hall sensor
140 indicator
150 compensating section
151 web
152 projection
160 indicator section
161 seal (e.g. O-ring)
162 passage
163 front wall
164 marking
165 marking
166 area
170 sensor device
171 magnet
172 sensor (e.g. Hall sensor, reed contact, etc.)

BRIEF DESCRIPTION OF THE DRAWINGS

FIG. 3 shows an exterior view of a handlebar tube for the hydraulic master apparatus of FIG. 1.
FIG. 4 shows a side view of the handlebar tube of FIG. 3.
FIG. 5 a shows a side view of a shifting device for the hydraulic master apparatus of FIG. 1.
FIG. 6 shows a top view of the s lifting device of FIG. 5.
FIG. 7 shows a view of the shifting device of FIG. 5 seen from the end of the handlebar tube towards the center of the handlebar tube in a handlebar tube.
FIG. 8 shows a side view of a pressure piece for the hydraulic rooster apparatus of FIG. 1.
FIG. 9 shows a view of the pressure piece of FIG. 8 seen from the center of the handlebar.

FIG. 20 shows a view of the hydraulic master apparatus of FIG. 10 or FIG. 1 seen from the handlebar end.

FIG. 21 shows an enlarged partial view of the sectional view of FIG. 12.

FIG. 22 shows a sectional view according to FIG. 1 of a hydraulic master apparatus according to an alternative embodiment of the invention.

DETAILED DESCRIPTION OF THE EMBODIMENTS

Figure 1:
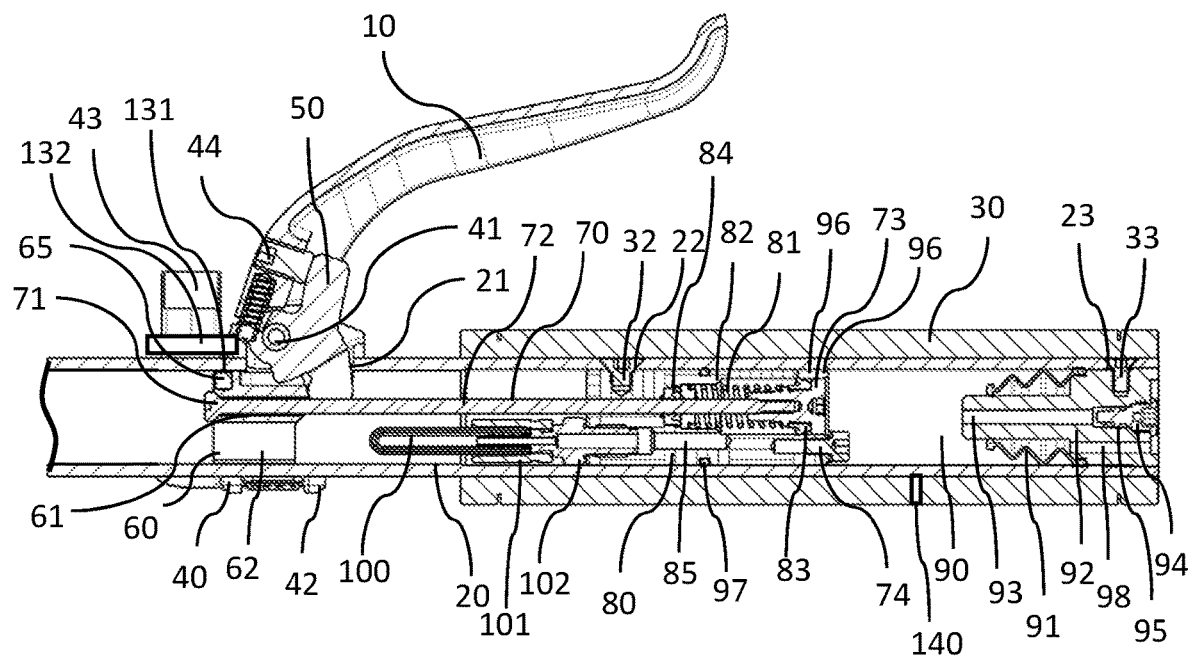
FIG. 1 shows a sectional view through a first design of a hydraulic master apparatus according to an embodiment of the invention.

FIGS. 1 to 9 show a first design of a hydraulic master apparatus according to an embodiment of the invention.

The hydraulic master apparatus 1 is a master apparatus of a hydraulic bicycle brake, for example a hydraulic brake or a hydraulic disk brake or hydraulic rim brake. Only the hydraulic master apparatus and the hydraulic line 100 are shown, which leads to the hydraulic slave apparatus (not shown) and the design of which is known to a person skilled in the art.

The hydraulic master apparatus 1 comprises a hydraulic cylinder 80, which is integrated in the handlebar tube 20 of the handlebar-guided vehicle.

The handlebar tube 20 comprises an opening 21, through which a pressure piece 50 extends, which is pivotally arranged on a support 40 attached to the handlebar tube 20.

The hydraulic master apparatus 1 comprises a lever 10, which is pivotally arranged on the support 40. The axis of rotation 41 for the pressure piece 50 and the lever 10 is identical in the illustrated embodiment.

In addition, a grip width adjusting device 44 is provided with which the initial position of the lever 10 can be changed in the rest position. The support 40 is attached to the handlebar tube 20 by means of a clamp 42. An optional adapter 43 is provided on the clamp 42 to be able to accommodate a switch device (not shown).

A shifting device 60 is provided in the handlebar tube 20 and is arranged in the handlebar tube 20 in such a way that it can be moved along the longitudinal direction of the handlebar tube 20. The shifting device 60 can be designed as a gate. The shifting device 60 comprises a passage 61, which accommodates a pulling device 70, and a passage 62, through which the hydraulic line 100 runs.

FIGS. 5 to 7 show the shifting device 60, and FIGS. 8 to 9 show the pressure piece 50. The embodiment described below secures the shifting device 60 in the handlebar tube 20 against rotation. An anti-turn system can be important because the hydraulic line 100 could exert a torque on the shifting device 60 due to twisting during the assembly, especially if the hydraulic line runs through the passage 62.

In order to prevent rotation, the sliding device 60 has a web 63 which is accommodated by two extensions 57 of the pressure piece 50. This ensures that the shifting device 60 cannot rotate in the circumferential direction of the handlebar tube 20 in relation to the pressure piece 50.

The shifting device 60 comprises a groove 64 into which the pressure piece 50 can immerse when the hydraulic unit is actuated.

When the lever 10 is actuated, the pressure piece 50 is rotated about the axis of rotation 41 and moves the shifting device 60 towards the center of the vehicle, i.e. to the left in FIG. 1. In the illustrated embodiment, the pulling device 70 is designed as a pull rod. The pulling device 70 has a head 71 which is engaged by the shifting device 60 that moves the pulling device 70 to the left when the lever 10 is actuated. The pulling device 70 has a main body 72 and a screw connection 73. The screw connection 73 acts as a piston of the master apparatus 1 and is arranged in the hydraulic cylinder 80. It is secured by means of a screw 74. When the lever 10 is actuated, the screw 74 is pressed to the left against the force of a return spring 81. The return spring 81 is arranged in the pressure chamber 82 of the master cylinder 80.

A compensating container 90 or reservoir for hydraulic fluid is provided to the right of the master cylinder 80. The compensating container 90 is confined to the outside by the handle tube 20. Towards the handlebar end, the compensating container is limited by a cover 92 with a bellows 91. The bellows 91 separates the hydraulic fluid in the compensating container 90 from a gas or air volume to compensate tor hydraulic fluid subsequently flowing into the pressure chamber. In the embodiments using an air volume inside the bellows, this air volume is connected to the outside air via a vent hole 98. An opening 93 with a vent screw 94 is provided in the cover 92. A cone 95 is provided in opening 93 so that a commercially available syringe con be inserted in order to introduce hydraulic fluid into or withdraw hydraulic fluid from the compensating container. The cover 92 is secured against rotation by means of a screw 33, which is arranged in an opening 23 in the handle tube 20 and is screwed into the screw connection 73.

A handle tube 30 is provided outside the handlebar tube 20 and can be made of an elastic rubber material, for example.

The cylinder 80 is secured in the handlebar tube 20 against slipping and rotation by means of a screw 32, which is arranged in an opening 22 in the handle tube and is screwed into the master cylinder 80.

The compensating container 90 is connected to the pressure chamber 82 via an overflow channel 96. A primary seal 83 is provided on the screw connection 73 and, when the brake is actuated, passes over the overflow channel and separates the pressure chamber 82 from the compensating container 90 so that pressure can build up in the pressure chamber 82.

The compensating container 90 is sealed against the interior of the handlebar tube 20 by a seal 97, which is arranged between the handlebar tube 20 and the master cylinder 80.

A further seal 84 is provided on the pulling device 70 and seals the pressure chamber 82 against the main body 72 of the pulling device 70.

When the hydraulic master apparatus 1 is actuated, the lever 10 is pressed downwards, causing the pressure piece 50 to move about the axis of rotation 41 against the shifting device 60 and pushing the shifting device to the left. As a result, the pulling device 70 moves to the left and pulls the piston, i.e. in the embodiment the screw connection 73, into the hydraulic cylinder 80 (in FIG. 1 to the left). This builds up a pressure in the pressure chamber 82 and hydraulic fluid is pressed into the hydraulic line 100, which is connected to the hydraulic slave (not shown).

The web of the shifting device 60 has a contour 66, the shape of which can be used to set a progressive and/or degressive course of the transmission ratio as required. As shown in FIG. 5, the contour 66 of the web 63 is relatively far to the right in the upper part, going a little further to the right. Then, the web 63 tapers so that the contour runs further to the left. As a result, the transmission ratio does not decrease as much with increasing actuation as with a design of a straight contour. This is advantageous for the embodiments of the invention, which have a very low pivot point that requires a high transmission ratio, which is undesirable at the beginning of the actuation, because the clearance is to be crossed almost without force and quickly, i.e. with a low transmission ratio. A high transmission ratio is only advantageous when pressure is built up. The contour can at least partially compensate for the disadvantage of the low pivot point, so that the decrease is not as strong as with a straight contour.

The hydraulic master apparatus 1 has a sensor device 130 for the detection of the position and/or actuation of the hydraulic master apparatus 1. The signal of the sensor apparatus 130 can, for example, be used to indicate the actuation of the hydraulic master apparatus 1 by causing a brake light to illuminate by means of a suitable control device known to a person skilled in the art. Alternatively or additionally, the detection of the position of the hydraulic master apparatus 1 can be used to activate a recuperation apparatus which supports braking and at the same time feeds energy into a reservoir which can later be used to drive the vehicle. The recuperation apparatus can, for example, be switched on as soon as the connection between pressure chamber 80 and compensating chamber 90 has been interrupted. This function can be specifically used by the driver, for example, to effect a pure engine brake through recuperation when driving downhill, before the clearance between brake lining and brake disk or rim has been completely crossed.

In the embodiment of FIGS. 1 to 9, the sensor device includes a position sensor. A magnet 131 is arranged in a support 65 of the shifting device 60. A Hall sensor 132 is provided on the handlebar tube to detect the distance travelled by the shifting device 60 within the handlebar tube 20. Depending on the geometry of the master cylinder, the shifting device 60 is first moved from the rest position about 2-3 mm into the handlebar tube 20 until the connection between the pressure chamber 82 and the compensation chamber 90 is interrupted. As a result of the further actuation, the shifting device 60 moves another 5-6 mm into the handlebar tube 20, the clearance between the brake linings and the brake disk or rim being crossed. In this area of partial actuation, i.e. after the separation between pressure chamber 82 and compensating chamber 90, but before the clearance between the brake linings and the brake disk or rim has been crossed, i.e. before the braking effect begins, it can be advantageous to already achieve a slight braking effect if the vehicle has an electric drive. The signal from the sensor device can then be used to activate the recuperation, which includes a braking action and can simultaneously return the braking energy to the system to recharge the energy storage. Even in the case of full actuation with a braking effect by the hydraulic device, it can be advantageous or desirable to support the brake by switching on the recuperation.

In addition or as an alternative to the sensor device 130 for detecting the position and/or actuation of the hydraulic master apparatus 100, it is possible to use the detection of the pressure in the pressure chamber 82. For example, the recuperation apparatus can be activated as soon as the pressure in the pressure chamber 82 exceeds a certain threshold value. Exceeding the threshold value can indicate that a braking effect is achieved by the hydraulic apparatus 1. This value can also be used, for example, to switch on a brake light or to switch it off again if the value falls below a slightly lower threshold. The recuperation can also be deactivated if the value falls below a lower threshold, which is slightly lower than the threshold used for the activation. Alternatively or additionally, the deactivation can also be effected when the rest position is reached.

An indicator 140 can be provided in the handle tube 30 to indicate the filling level in the compensating chamber 90. The indicator 140 can be connected to the compensating chamber 90 via a suitable line or a plurality of suitable lines and be designed as a transparent or translucent line to indicate the filling level. Alternatively or additionally, a suitable sensor can detect the filling level in the compensating chamber and respond to the indicator accordingly. In this case, the display can include, for example, a series of visual indications, such as LED lamps. Other suitable indicators known to a person skilled in the art are conceivable.

Figure 10:
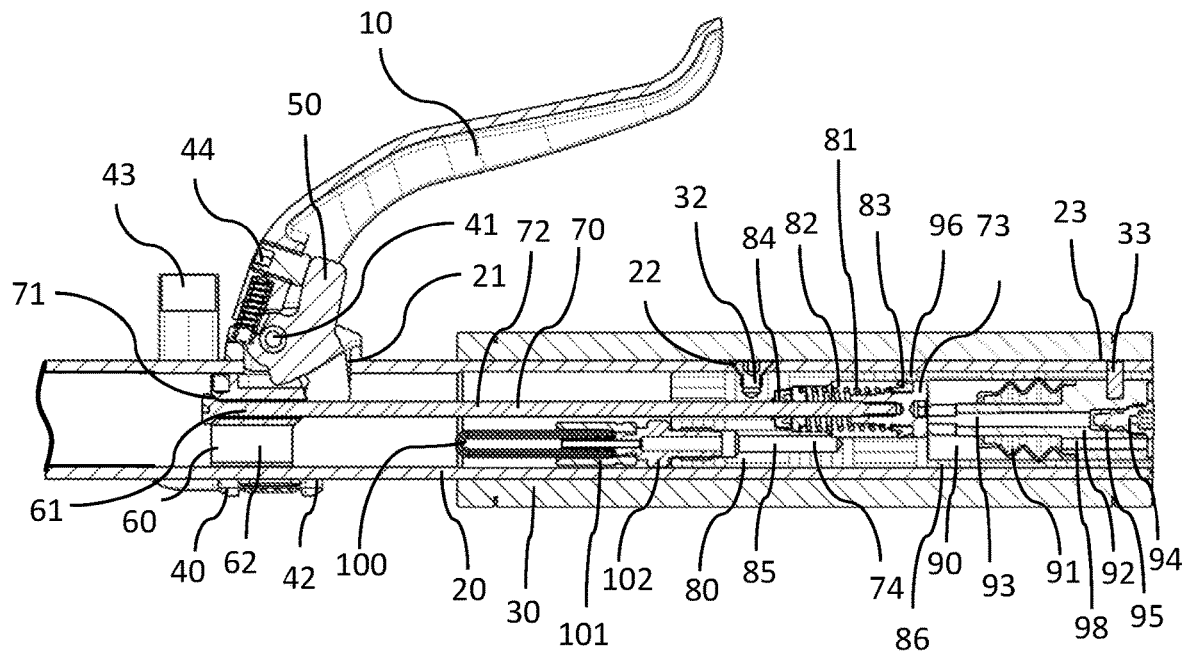
FIG. 10 shows a sectional view according to FIG. 1 of a hydraulic master apparatus according to an alternative embodiment of the invention.

FIG. 10 and FIG. 20 show an alternative embodiment of the invention which essentially corresponds to the embodiment of the invention shown in FIGS. 1 to 9. Equal reference signs denote equal or corresponding components or features.

Reference is made to the description of the other embodiments of the invention. In the following, the focus will be laid on the differences.

The master cylinder 80 comprises an extension 86, which extends to the end of the handlebar tube 20 and in which the compensating container 90 is accommodated. The extension 86 has an outer diameter which substantially corresponds to the inner diameter of the handlebar tube 20. Because the compensating chamber is accommodated in the extension 86, the seal 97 of the embodiment shown in FIGS. 1 to 3 can be omitted.

The advantage of this embodiment is that it can be installed in a handlebar tube as a unit which includes the compensating chamber 90.

Figure 11:
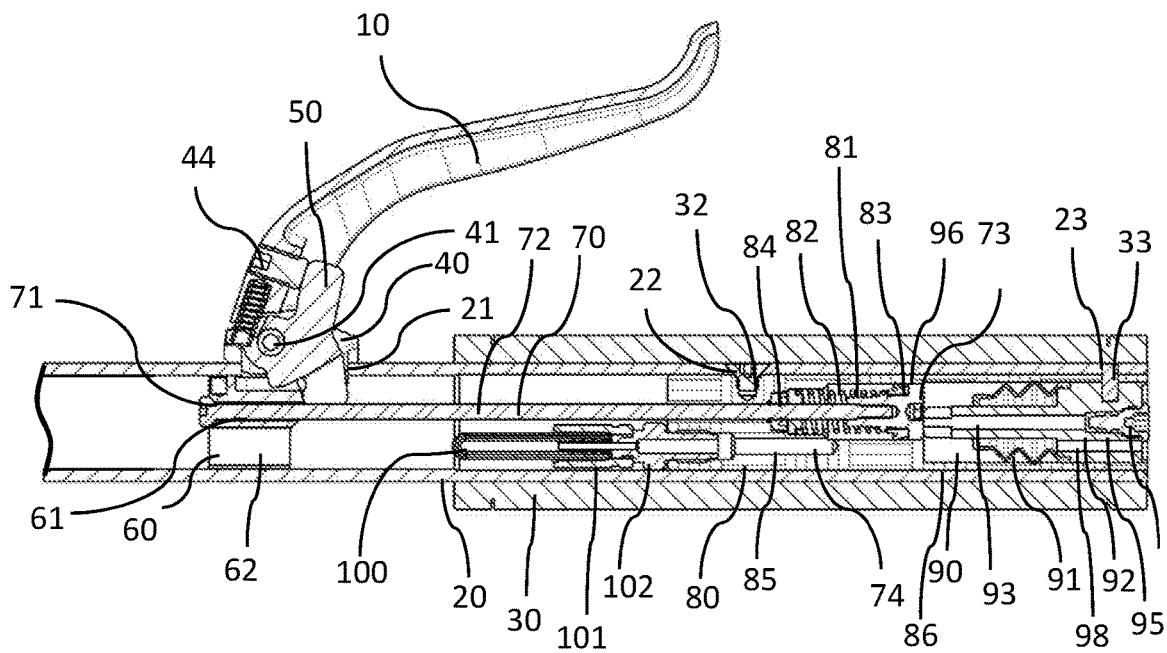
FIG. 11 shows a sectional view according to FIG. 1 of a hydraulic master apparatus according to an alternative embodiment of the invention.

FIG. 11 shows an alternative embodiment of the invention which substantially corresponds to the embodiments of the invention shown in FIGS. 1 to 9 or 10 and 20. Equal reference signs denote equal or corresponding components or features. Reference is made to the description of the other embodiments of the invention. In the following, the focus will be laid on the differences.

The support 40 is integrated in the handlebar tube 20. The clamp 42 and the adapter are therefore omitted. The switch unit can be mounted on the handlebar tube 20 in a manner known to a person skilled in the art. Since according to the invention the hydraulic master apparatus 1 is almost completely incorporated in the handlebar tube 20, except for the lever 10 and the associated components, there is sufficient space for mounting the switch unit or other components.

Figure 12:
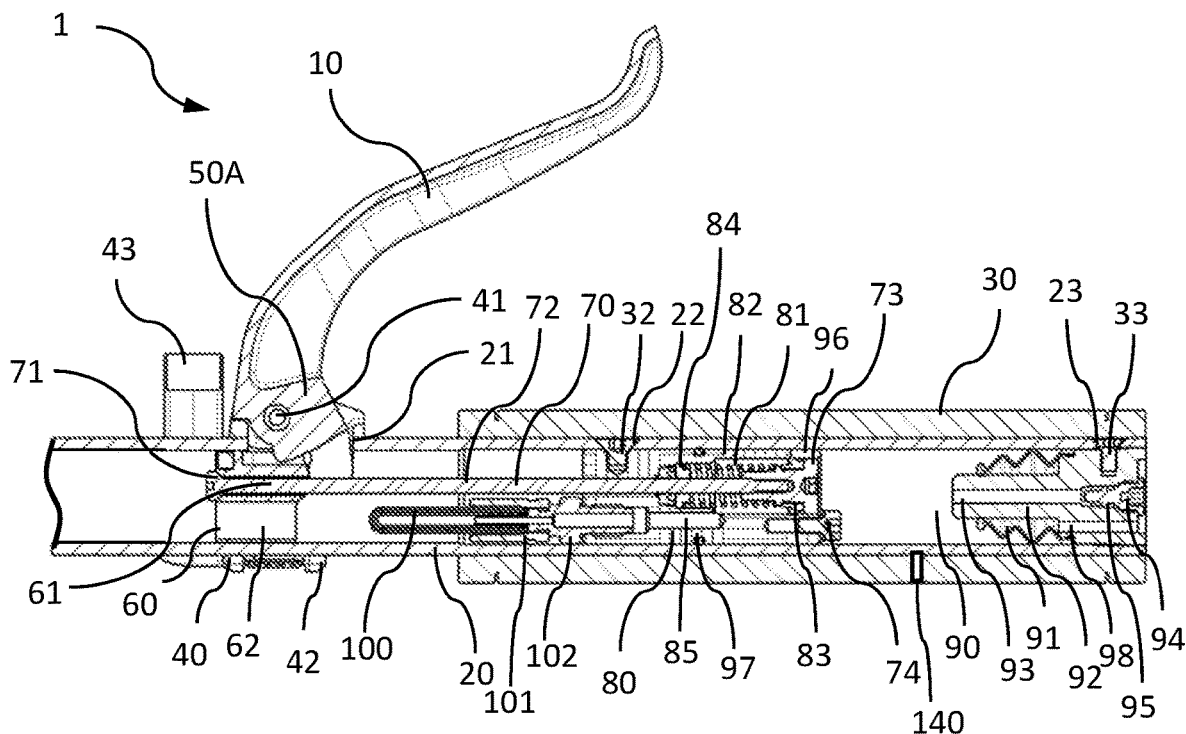
FIG. 12 shows a sectional view according to FIG. 1 of a hydraulic master apparatus according to an alternative embodiment of the invention.
Figure 13:
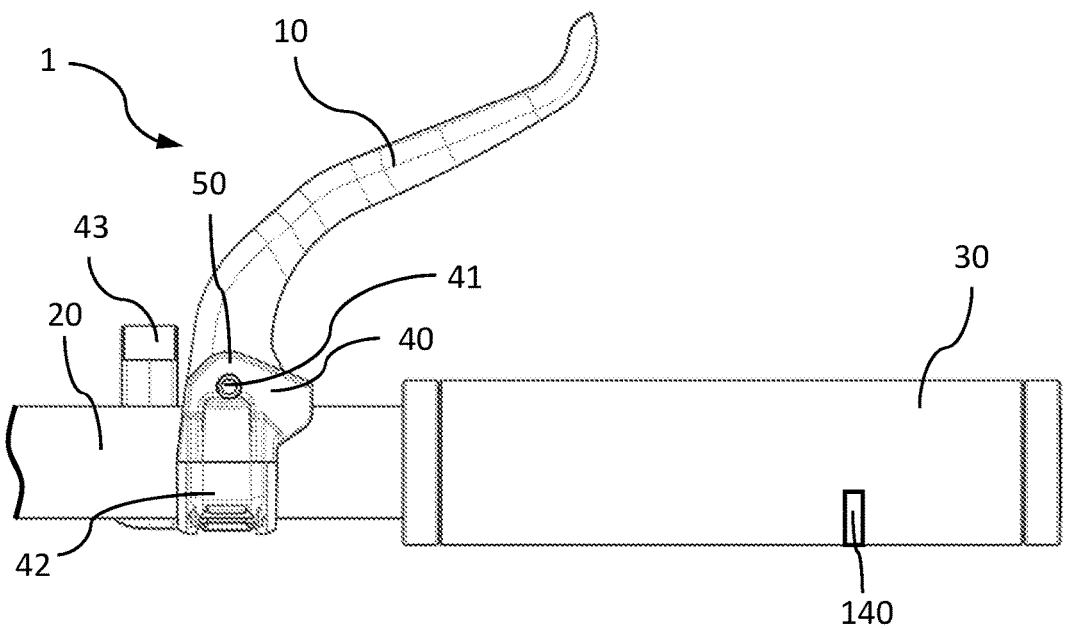
FIG. 13 shows a side view of the hydraulic master apparatus of FIG. 12.

FIG. 12 and FIG. 13 show an alternative embodiment of the invention which substantially corresponds to the embodiment of the invention shown in FIGS. 1 to 9 or to the other embodiments of the invention. Equal reference signs denote equal or corresponding components or features. Reference is made to the description of the other embodiments of the invention. In the following, the focus will be laid on the differences.

In this embodiment, the lever 10 is made in one piece. The pressure piece 50 of the other embodiments is integrated in the lever 10. The lever 10 acts via its pressure piece section 50A corresponding to the pressure piece on the shifting device 60. The grip width adjusting device 44 is not available in this embodiment. The grip width can, for example, be changed by using different levers or in other ways that are known to a person skilled in the art.

According to this embodiment, like the corresponding other embodiments of the invention, the grip width can be adjusted e.g. by adjusting or shifting the support 40 with the lever 10 relative to the shifting device 60, so that the grip width is adjusted due to the engagement between the pressure piece section 50A of the lever 10 and the shifting device 60. For this purpose, the support 40 can be loosened by loosening the clamp 42, then moved along the handlebar tube 20 to the desired position and finally fixed in the new position by tightening the clamp 42.

The pressure piece section 50A has two extensions 57 according to the embodiment of FIGS. 1 to 9, which receive the web 63 to prevent rotation of the shifting device 60.

Figure 14:
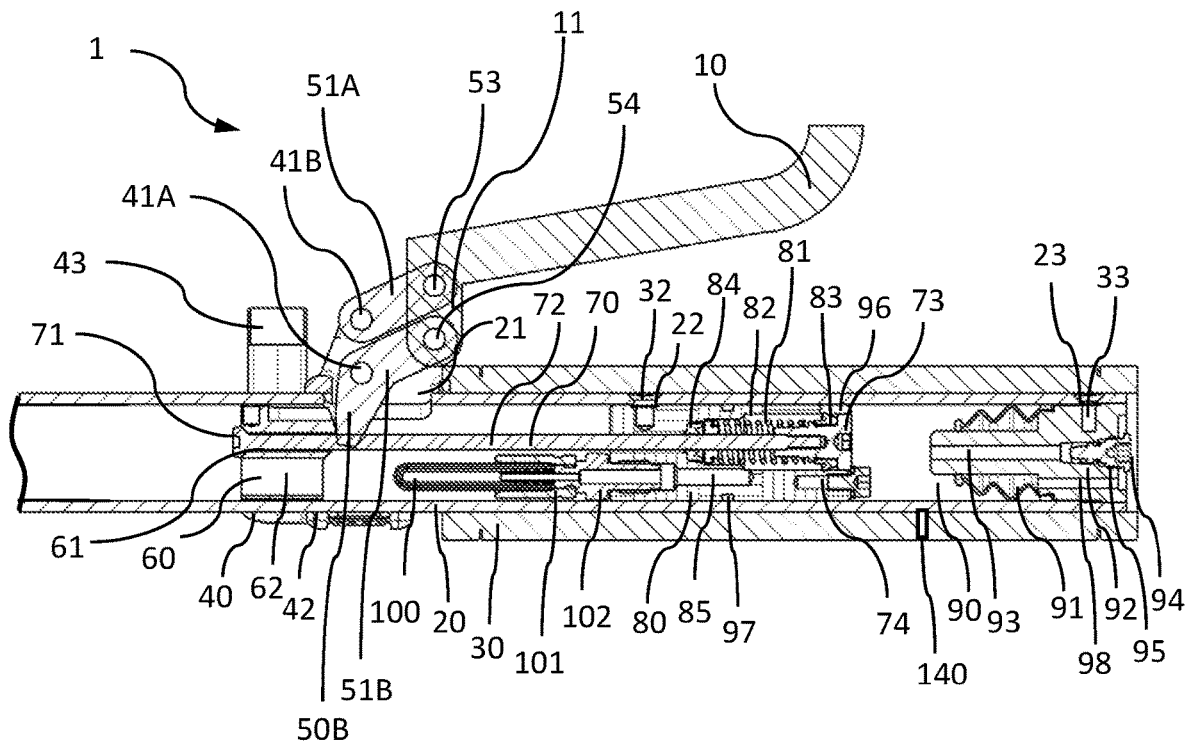
FIG. 14 shows a sectional view according to FIG. 1 of a hydraulic master apparatus according to an alternative embodiment of the invention.
Figure 15:
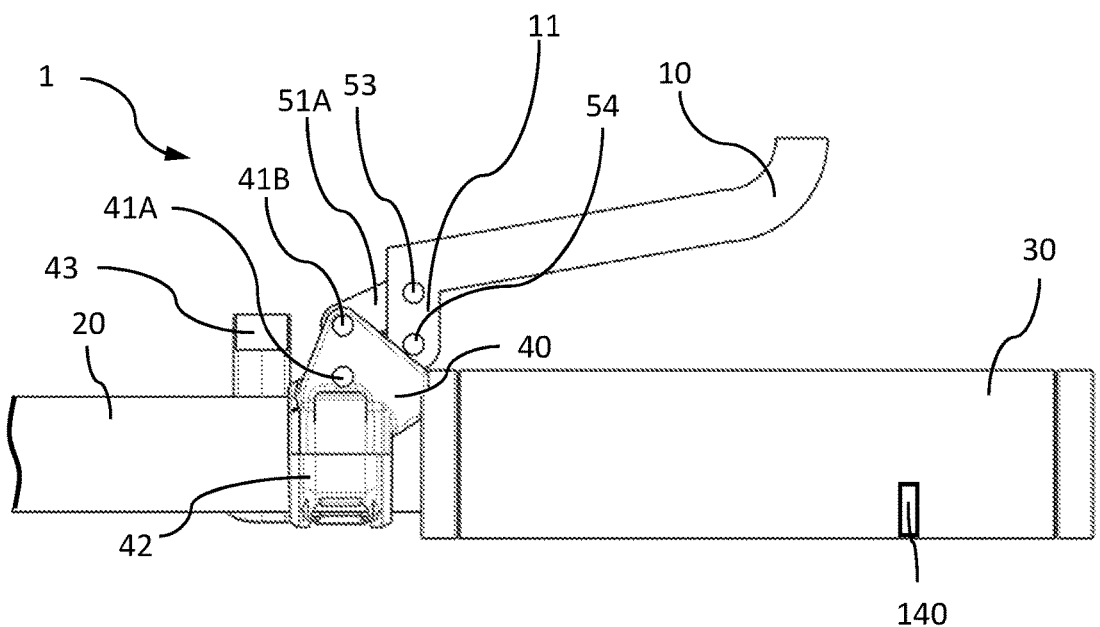
FIG. 15 shows a side view of the hydraulic master apparatus of FIG. 14.

FIGS. 14 and 15 show an alternative embodiment of the invention which substantially corresponds to the embodiment of the invention shown in FIGS. 1 to 9 or to the other embodiments of the invention. Equal reference signs denote equal or corresponding components or features. Reference is made to the description of the other embodiments of the invention. In the following, the focus will be laid on the differences.

The lever 10 and the pressure piece 50B are hinged via two pivot points 41A and 41B and an arm 51A to the support 40. The lever has an arm section 11 and the pressure piece 50B has an arm section 51B. The arm 51 is hinged to the support 40 via the axis of rotation 41B and connected to the lever 10 via the axis of rotation 53. The pressure piece 50B is hinged to the support via the axis of rotation 41A and connected to the arm section 11 of the lever via the axis of rotation 54.

A parallelogram is defined by the four axes of rotation 41A, 41B, 53 and 54, the sides of which are formed by the support 40, the arm 51A, the arm section 51B and the arm section 11.

The support 40 forms a fixed side. When the lever is actuated, the arm 51A and the arm section 51B rotate downwards and the arm section 11 of the lever moves downwards. The lever 10 thus moves substantially parallel to the handlebar tube 20 and at the same time experiences a slight movement in the longitudinal direction of the handle tube, which depends on the inclination of the arm 51A and the arm section 51B. At the same time, the pressure piece 50B is rotated about the axis of rotation 41A and actuates the hydraulic fluid as described above by shifting the shifting device into the handlebar tube (in FIG. 8 to the left).

This design allows a pleasant and easy handling of the hydraulic master apparatus.

Figure 16:
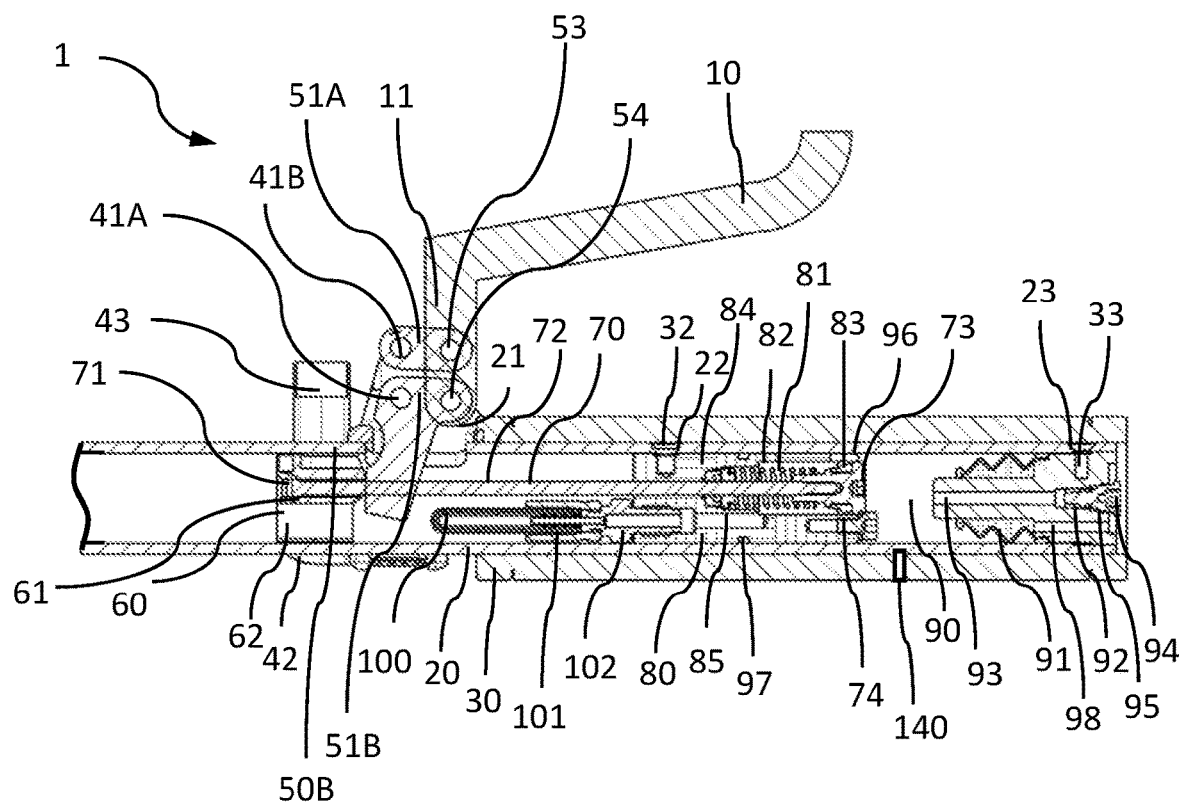
FIG. 16 shows a sectional view according to FIG. 1 of a hydraulic master apparatus according to an alternative embodiment of the invention.
Figure 17:
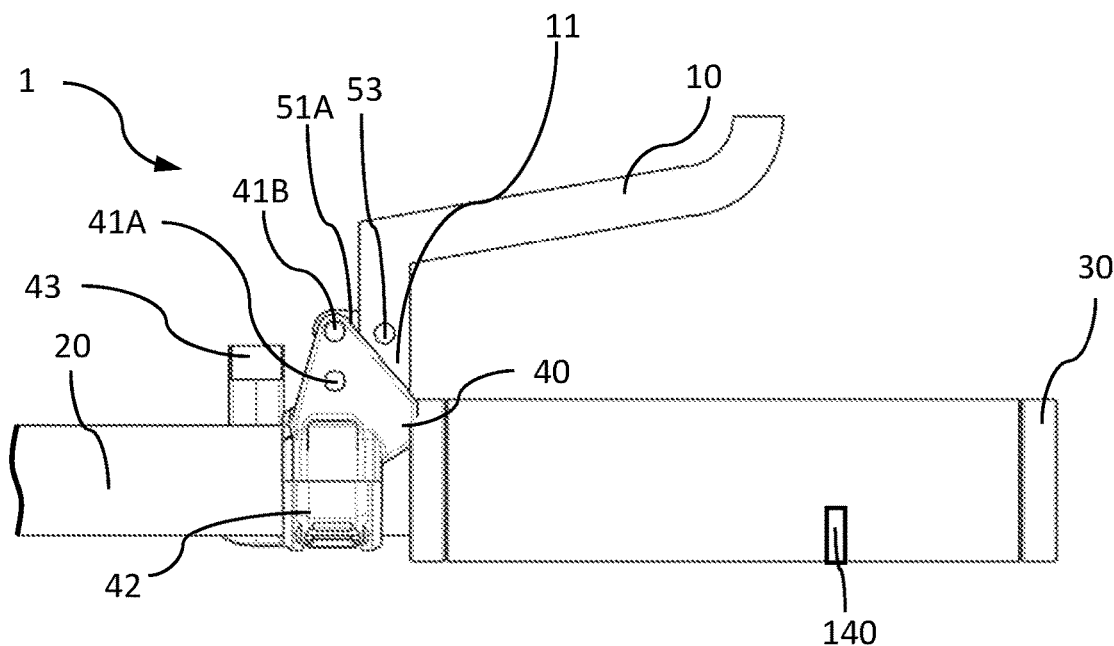
FIG. 17 shows a side view of the hydraulic master apparatus of FIG. 16.

FIGS. 16 and 17 show an alternative embodiment of the invention which substantially corresponds to the embodiment of the invention shown in FIGS. 14 and 15 or to the other embodiments of the invention. Equal reference signs denote equal or corresponding components or features. Reference is made to the description of the other embodiments of the invention. In the following, the focus will be laid on the differences.

In this embodiment, hinging the lever 10 in the rest position is selected in such a way that the arm 51A and the arm section 51B of the pressure piece 50B run almost parallel to the grip tube 20. This means that from the start the lever 10 is only moved in the direction of the center of the vehicle and not outwards. This has the advantage that when the hydraulic master apparatus is actuated, the fingers which are not used (e.g., in the case of two-finger or one-finger actuation) cannot easily get between the lever and the handlebar tube.

Figure 2:
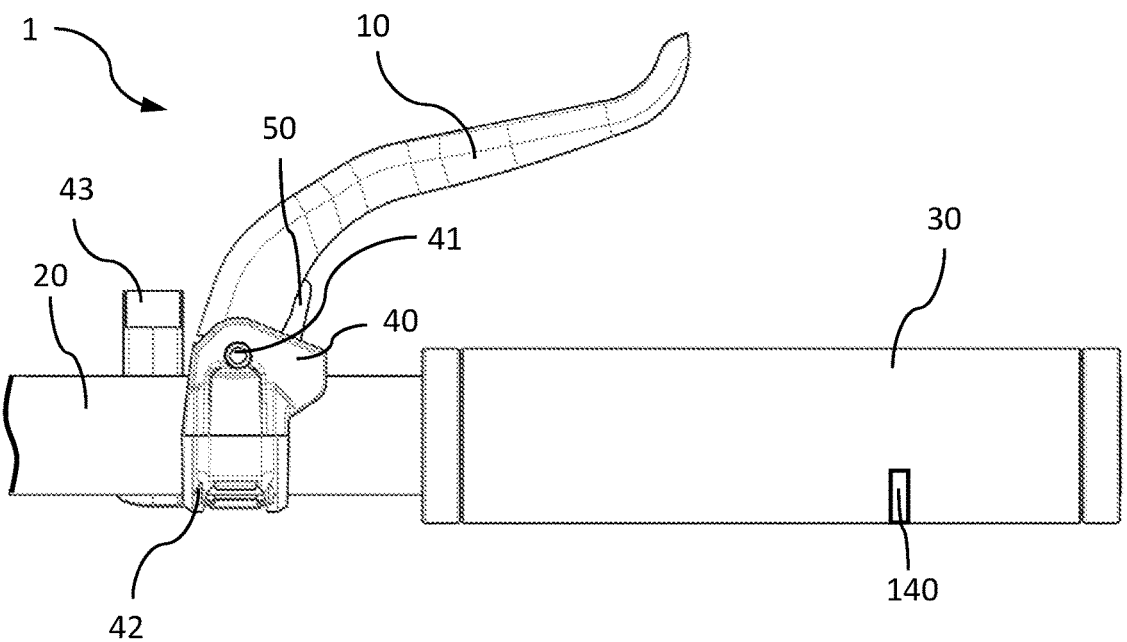
FIG. 2 shows a side view of the hydraulic master apparatus of FIG. 1.

FIGS. 18 to 21 show an alternative embodiment of the invention which substantially corresponds to the embodiment of the invention shown in FIGS. 1 to 3 or to the other embodiments of the invention. Equal reference signs denote equal or corresponding components or features. Reference is made to the description of the other embodiments of the invention. In the following, the focus will be laid on the differences.

In this embodiment, the pulling device 70 is provided with a hydraulic channel 75, which runs from the pressure chamber 82 through the shifting device 60 to the connecting piece 102. Instead of a pull rod, a draw tube is provided, which is used as the hydraulic channel 75. The hydraulic channel 75 is connected to the pressure chamber 82 via an opening 76. This embodiment has the advantage that the passage 62 is not used for the hydraulic line and therefore there is space in the passage 62 for other lines, which are particularly desired in the case of e-bikes for other tasks.

In this embodiment, the support 40 is integrated in the handlebar tube 20. The handlebar tube is provided with two tabs 45, which accommodate an axis as the axis of rotation 41 for the lever 10.

The compensating chamber 90 has a compensating housing 120. The compensating chamber 90 is the space between the master cylinder 80 and the compensating housing 120 and the space in the compensating housing 120 as well as the corresponding connecting lines, such as the passage 93.

Figure 18:
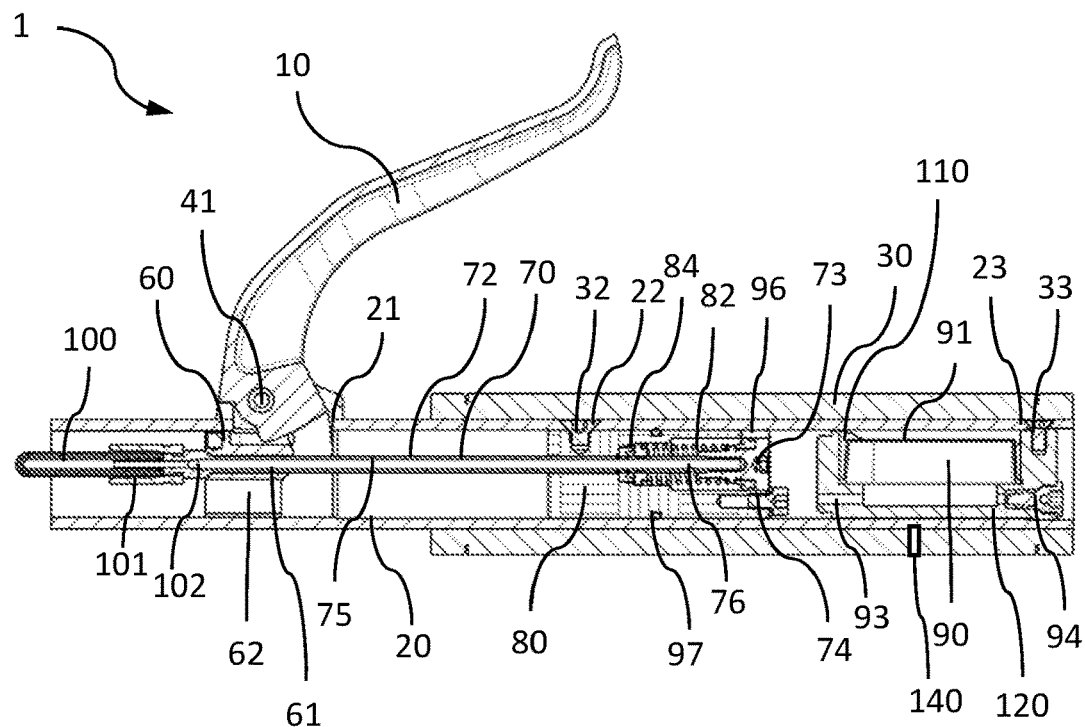
FIG. 18 shows a sectional view according to FIG. 1 of a hydraulic master apparatus according to an alternative embodiment of the invention.
Figure 19:
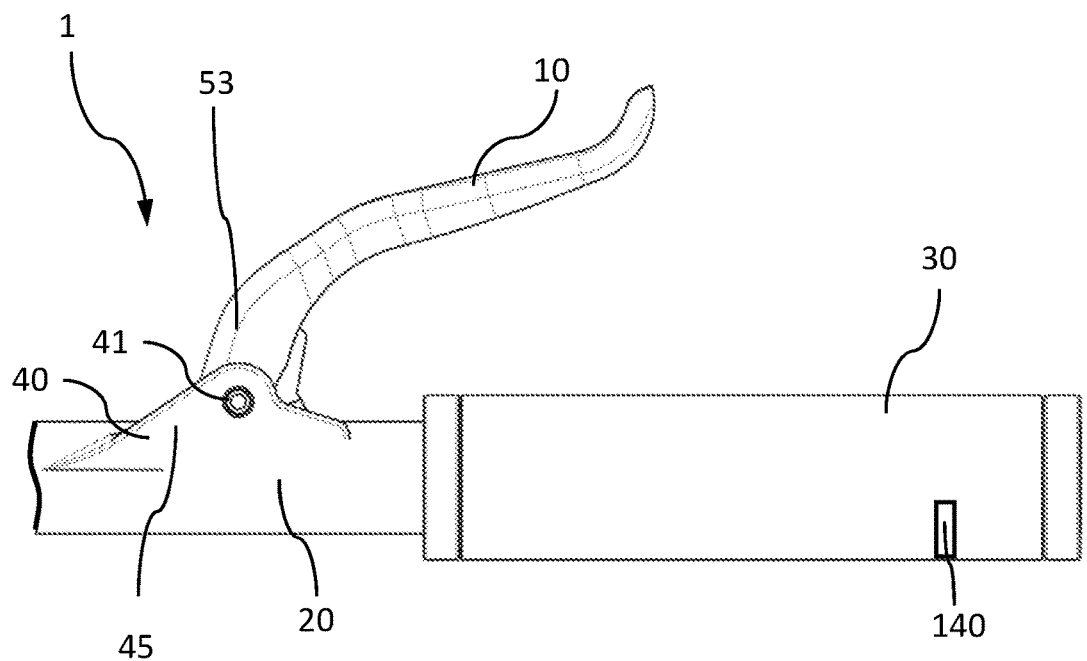
FIG. 19 shows a side view of the hydraulic master apparatus of FIG. 18.

The compensating chamber 90 is not rotationally symmetrical here, but has the vent screw 94 and the passage 93 on the upper side. In this context, the upper side is the side of the handlebar tube that is on the top in the upright vehicle. In FIG. 18, this is the lower side because the lever is usually mounted at an angle to the bottom to allow a comfortable and natural posture during operation.

Figure 30:
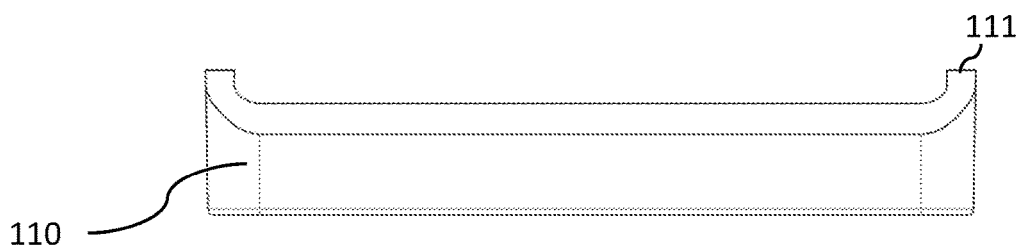
FIG. 30 shows a side view of a frame for the hydraulic master apparatus of FIG. 25.
Figure 31:
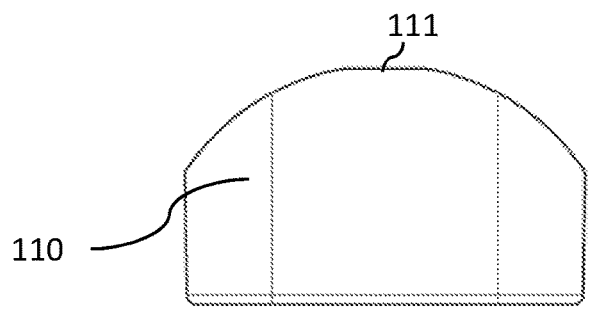
FIG. 31 shows a view of the frame of FIG. 30 seen from the handlebar end.
Figure 32:
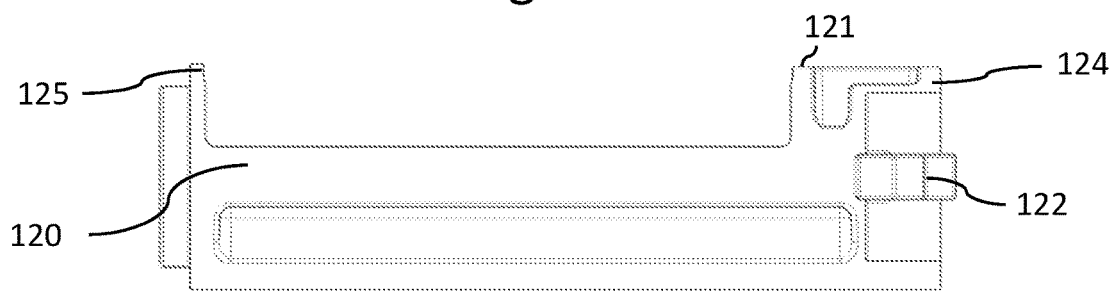
FIG. 32 shows a side view of a compensating housing for the hydraulic master apparatus of FIG. 25.
Figure 33:
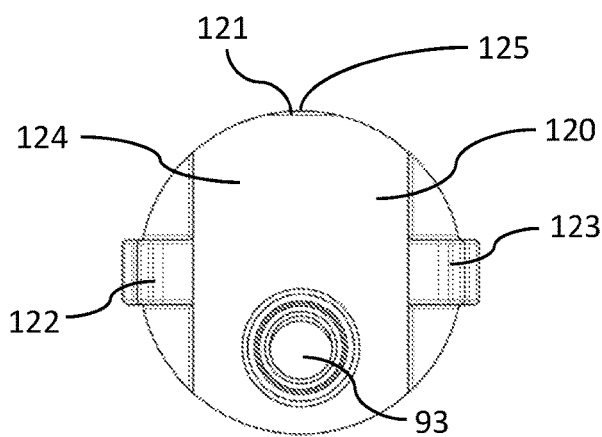
FIG. 33 shows a view of the compensating housing of FIG. 32 seen from the handlebar end.
Figure 34:
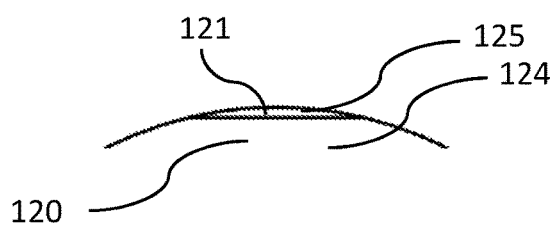
FIG. 34 shows an enlarged partial view of the view of FIG. 33.
Figure 35:
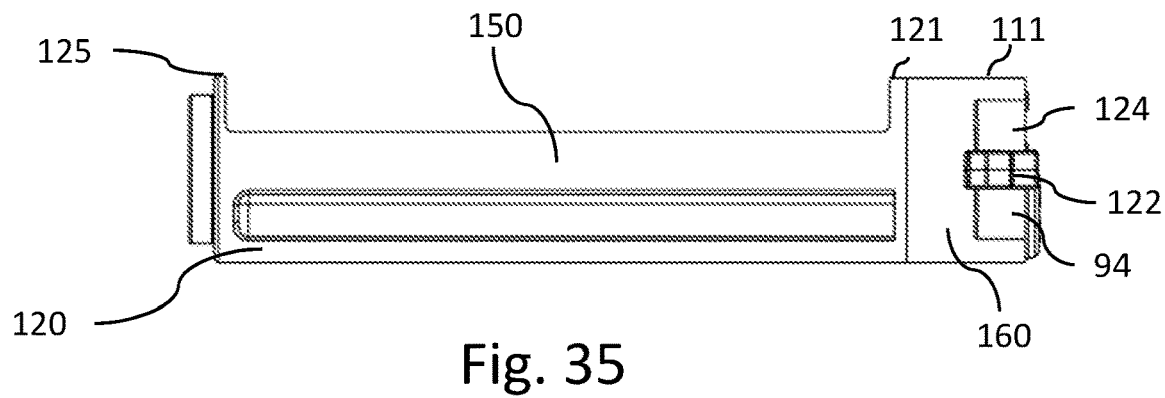
FIG. 35 shows a side view of an alternative compensating housing for a hydraulic master apparatus according to FIG. 25.

On the lower side (FIG. 18 above), related to the orientation during operation, the bellows 9 is provided which is pressed with a frame 110 into the compensating housing 120 of the compensating container 90. The frame can be designed according to the frame shown in FIGS. 30 and 31.

This orientation of the compensating chamber with the vent screw 94 on the upper side has the advantage that the system can be vented easily and safely. However, a disadvantage for operational safety might be that the passage is accordingly arranged on the upper side, because air or gas might possibly collect there. In order to avoid this disadvantage, passage 93 could be rotated in relation to vent screw 94, i.e. it could be arranged at a lower point of the compensating housing 120.

FIGS. 22 and 20 show an alternative embodiment of the invention that substantially corresponds to the embodiment of the invention shown in FIGS. 18 to 21 or to the other embodiments of the invention. Equal reference signs denote equal or corresponding components or features. Reference is made to the description of the other embodiments of the invention. In the following, the focus will be laid on the differences.

In this embodiment, the support 40 is attached to the handlebar tube with a clamp 42. This has the advantage that the grip width can be adjusted by adjusting the position of the support 40 relative to the shifting device 60.

Figure 23:
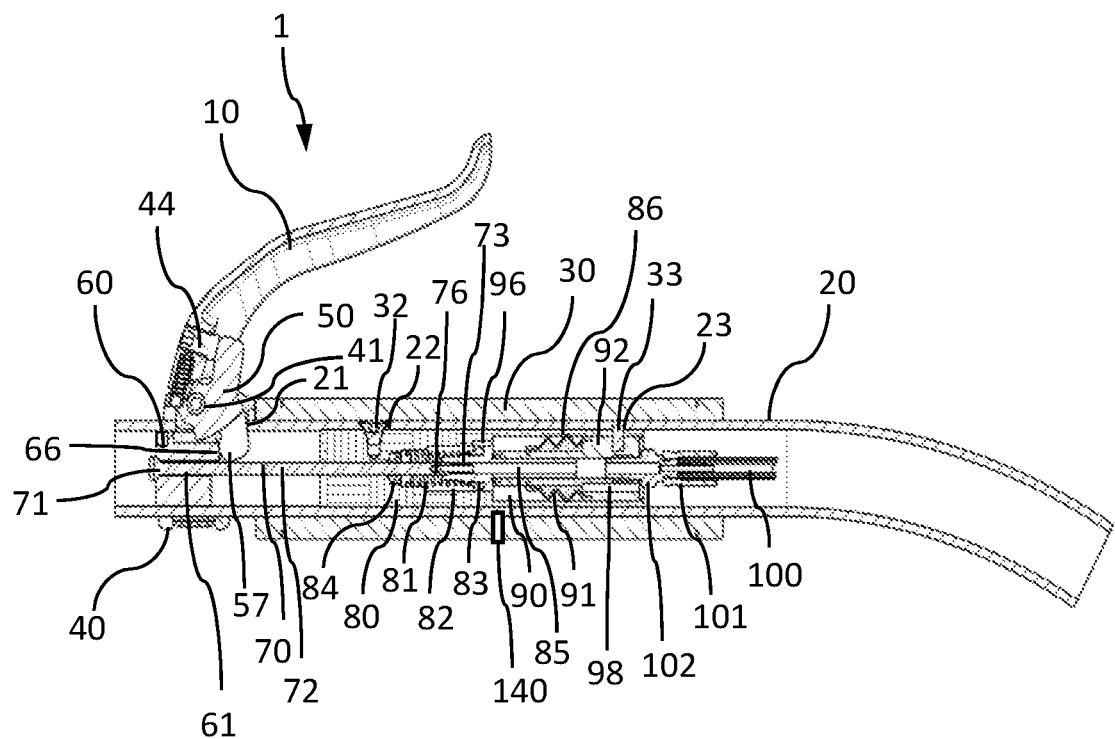
FIG. 23 shows a sectional view according to FIG. 1 of a hydraulic master apparatus according to an alternative embodiment of the invention.
Figure 24:
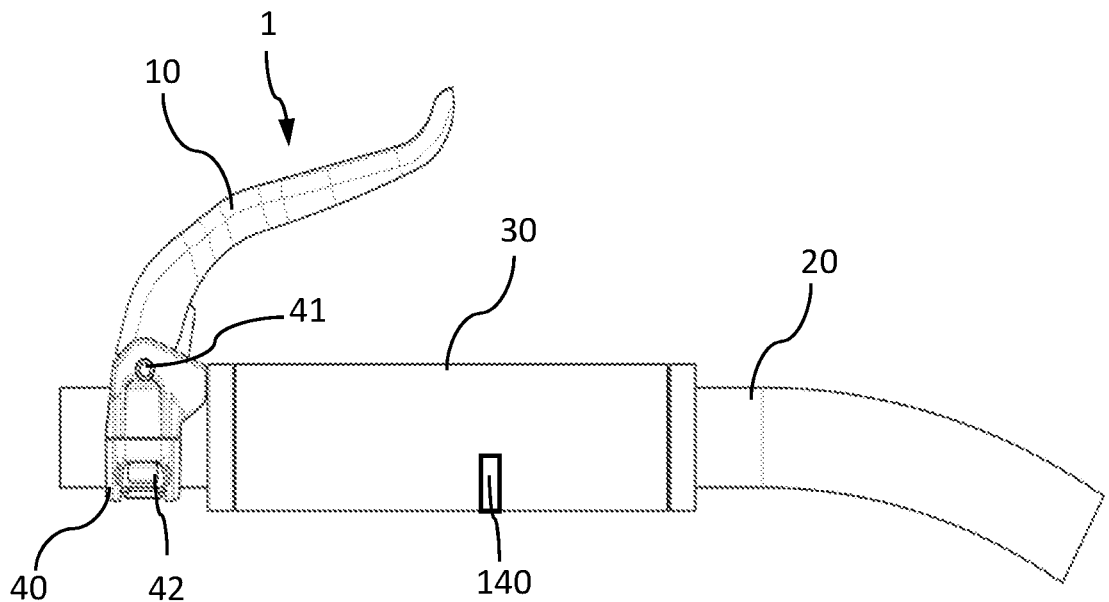
FIG. 24 shows a side view of the hydraulic master apparatus of FIG. 23.
Figure 25:
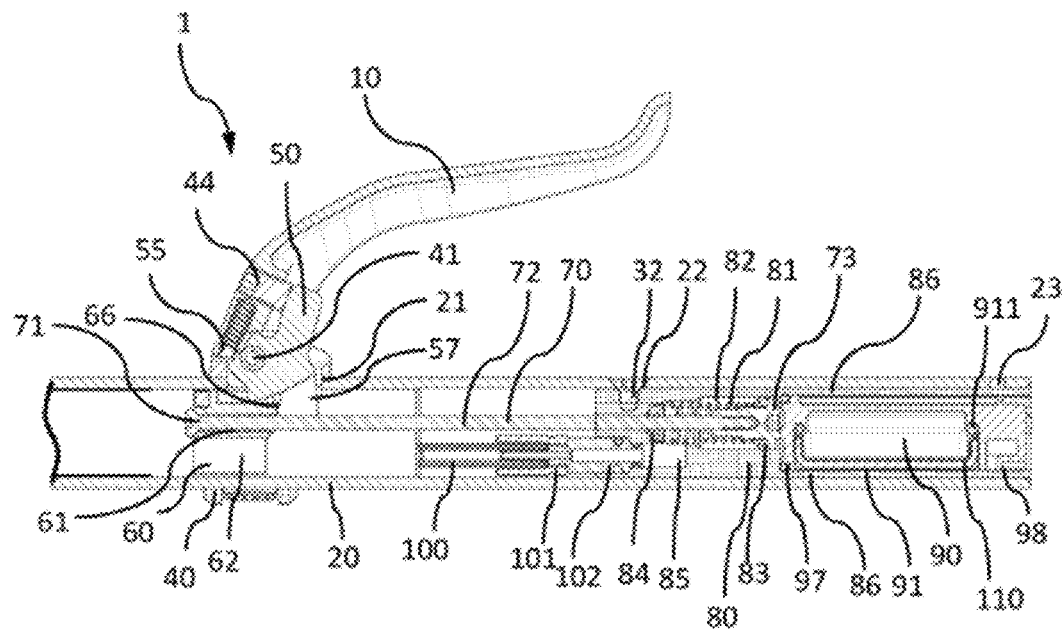
FIG. 25 shows a sectional view according to FIG. 1 of a hydraulic master apparatus according to an alternative embodiment of the invention.
Figure 26:
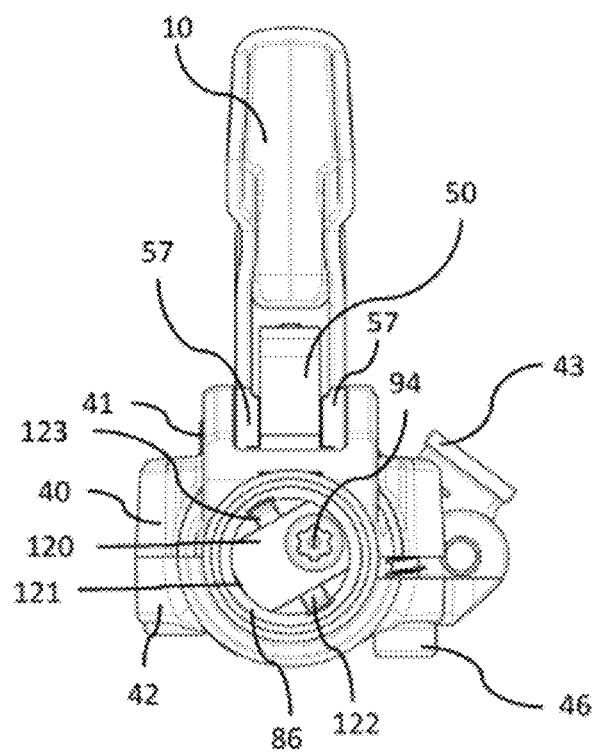
FIG. 26 shows a view of the hydraulic master apparatus of FIG. 25 seen from the handlebar end.
Figure 27:
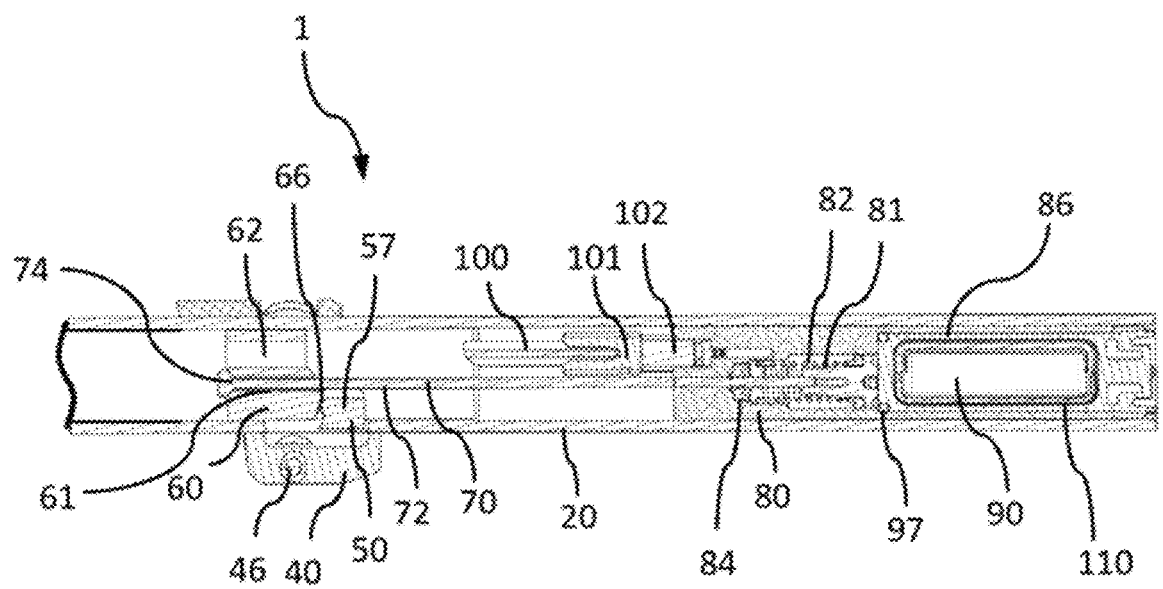
FIG. 27 shows a sectional view of the hydraulic master apparatus of FIG. 25.
Figure 28:
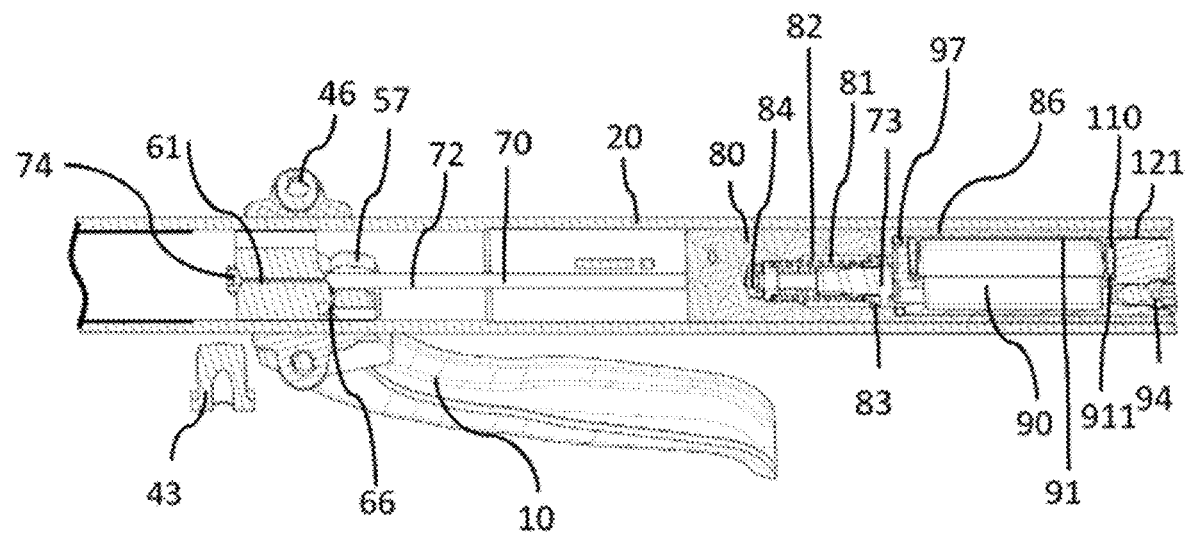
FIG. 28 shows a sectional view of the hydraulic master apparatus of FIG. 25.
Figure 29:
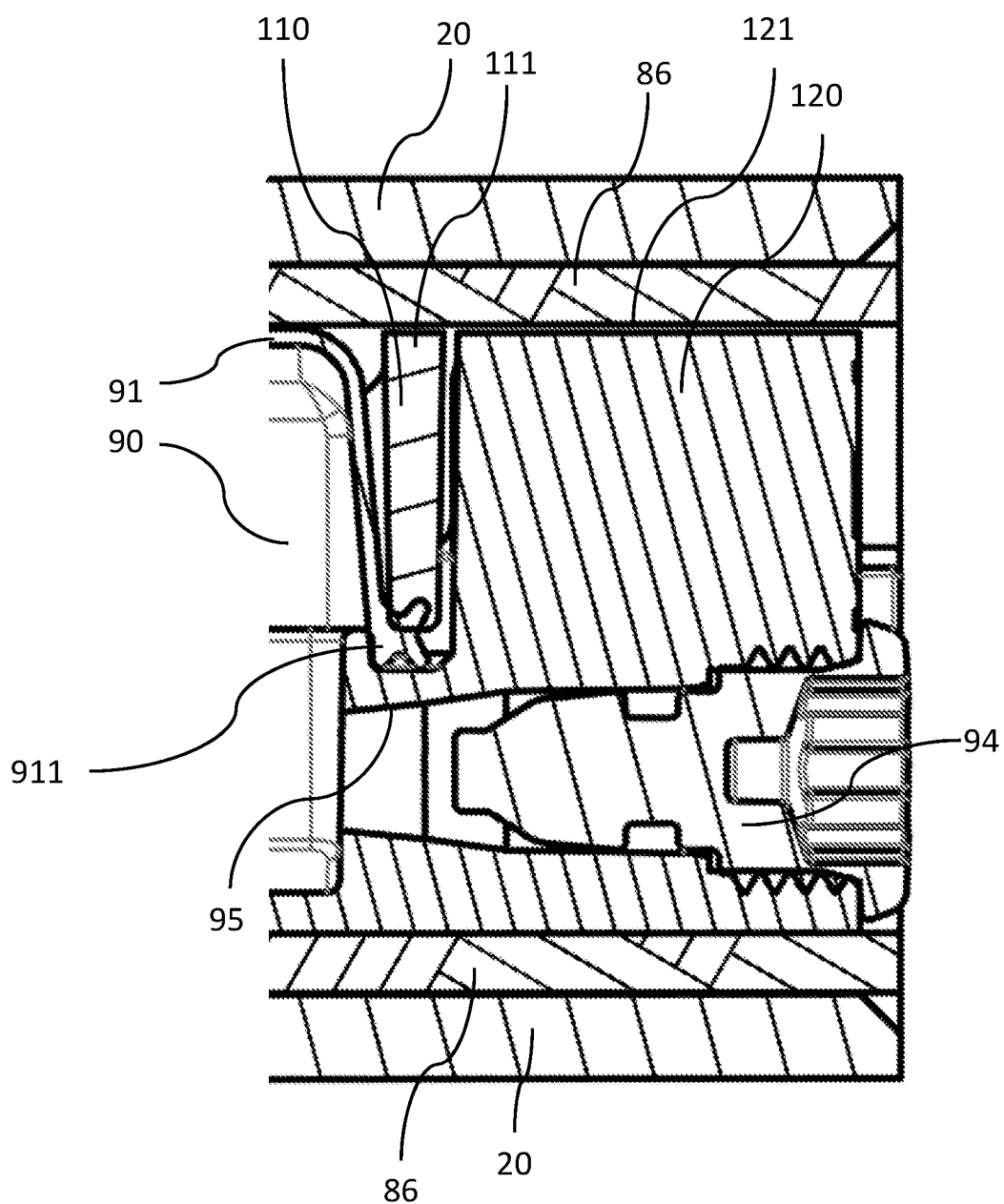
FIG. 29 shows an enlarged partial view of the sectional view of FIG. 28.

FIGS. 23 to 24 show an alternative embodiment of the invention which substantially corresponds to the embodiment of the invention shown in FIGS. 1 to 3 or to the other embodiments of the invention. Equal reference signs denote equal or corresponding components or features. Reference is made to the description of the other embodiments of the invention. In the following, the focus will be laid on the differences.

In the embodiment of FIGS. 23 and 24, the handle tube 30 is arranged closer to the center of the vehicle or handlebar in relation to the lever 10 and the support 40. In other words, the lever 10 is arranged on the outer side of the handlebar tube 20.

The head 71 of the pulling device 70 can therefore be reached from the outside of the handlebar tube 20, so that the grip width of the lever 10 can be adjusted by changing the length of the pull bar (main body 72). For example, the head 71 could be designed as a screw that is screwed onto a threaded section of the pull rod so that the grip width can be adjusted by turning the head 71.

The screw connection 73, which forms the piston of the master cylinder 80 and which is engaged by the traction device 70, has a connecting piece 731, which extends into the compensating chamber 90, which is arranged in the direction of the center of the vehicle. A pressure line 85 is arranged in the connecting piece 731, which communicates with the pressure chamber 82 via an opening 76.

The pressure line 85 runs through the compensating chamber 90 and is connected to a hydraulic line 100.

The shifting device 60 is arranged on the outside of the handlebar tube 20. By moving the support 40 on the handlebar tube 20, the grip width can be adjusted. Alternatively, the pulling device 70 can also be adjusted in the shifting device 60, in which the head 71, which can be designed as a screw, is adjusted relative to the main body 72, or the main body is turned in the screw connection 73.

The master cylinder 80 is arranged relative to the shifting device 60 further in the direction of the vehicle center or between the shifting device 60 and the compensating chamber 90.

FIGS. 25 to 34 show an alternative embodiment of the invention which substantially corresponds to the embodiment of the invention shown in FIG. 22 or to the other embodiments of the invention. Equal reference signs denote equal or corresponding components or features. Reference is made to the description of the other embodiments of the invention. In the following, the focus will be laid on the differences.

In this embodiment, the vent screw 94 is arranged at the bottom. This is disadvantageous insofar as the vehicle should be turned upside down or should be placed or arranged on its side for the safest possible ventilation, so that the vent screw 94 is positioned as high up as possible for venting. However, this embodiment has the advantage of a higher operational safety, because the passage 93 is farther down and therefore the probability that air or gas is present there is relatively low.

The master cylinder 80, like the embodiment of FIGS. 10 to 11, has an extension 86, in which the compensating chamber 90 is accommodated, so that the master cylinder 80 with the compensating chamber 90 Can be inserted into the handlebar tube 20 as a pre-assembled unit. The compensating chamber 90 comprises a compensating housing 120 with the bellows 91, which is secured at the bead 911 via a frame 110 in the compensating housing 120. The compensating housing, is arranged in the extension 86 of the master cylinder 80 and secured by two snap devices 122, 123 in the extension 86, which engage in corresponding openings as soon as the compensating housing 120 has been pushed far enough into the extension.

The compensating housing 120 has a front wall 125 facing the master cylinder 80 or the screw connection 73 and a front wall 124 which faces away from the master cylinder 80 or the screw connection 73 and has a flattening 121. The flattening ensures a connection from the upper side of the bellows 91 to the outside, so that the bellows can move as force-free as possible into and out of the compensating chamber, i.e. that the movement does not have to take place against an increasing or decreasing pressure. The frame 110 has a corresponding flattening 111 on its front side facing outwards.

FIGS. 35 to 45 show an alternative embodiment of the invention, which substantially corresponds to the embodiment of the invention shown in FIGS. 25 to 34 or to the other embodiments of the invention. Equal reference signs denote equal or corresponding components or features. Reference is made to the description of the other embodiments of the invention. In the following, the focus will be laid on the differences.

Figure 36:
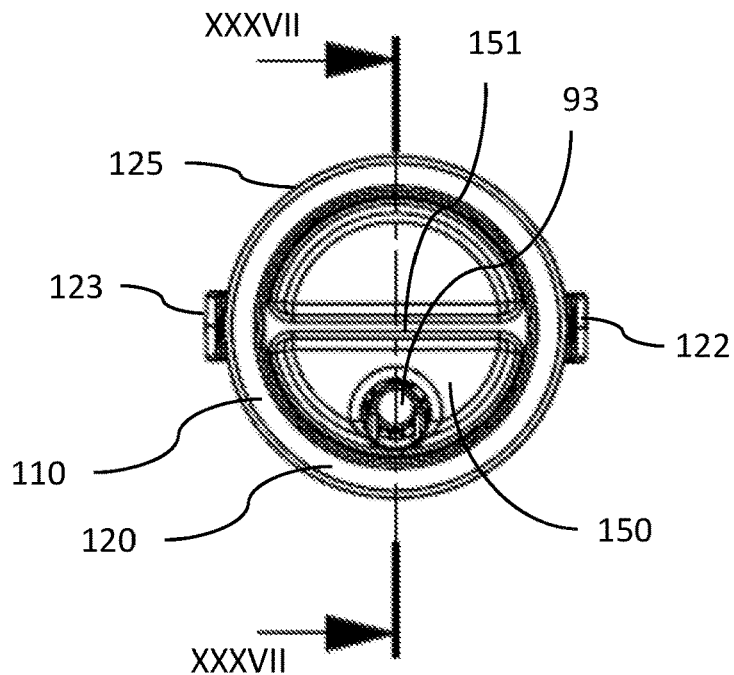
FIG. 36 shows a view of the compensating housing of FIG. 35 seen from the left side in FIG. 35.
Figure 37:
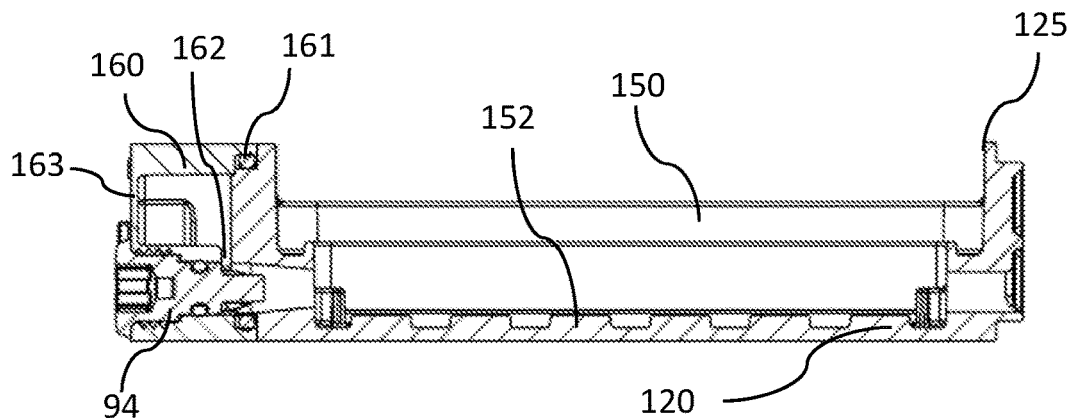
FIG. 37 shows a sectional view of the compensating housing of FIG. 35 in the sectional plane marked with the arrows XXXVII in FIG. 36.
Figure 38:
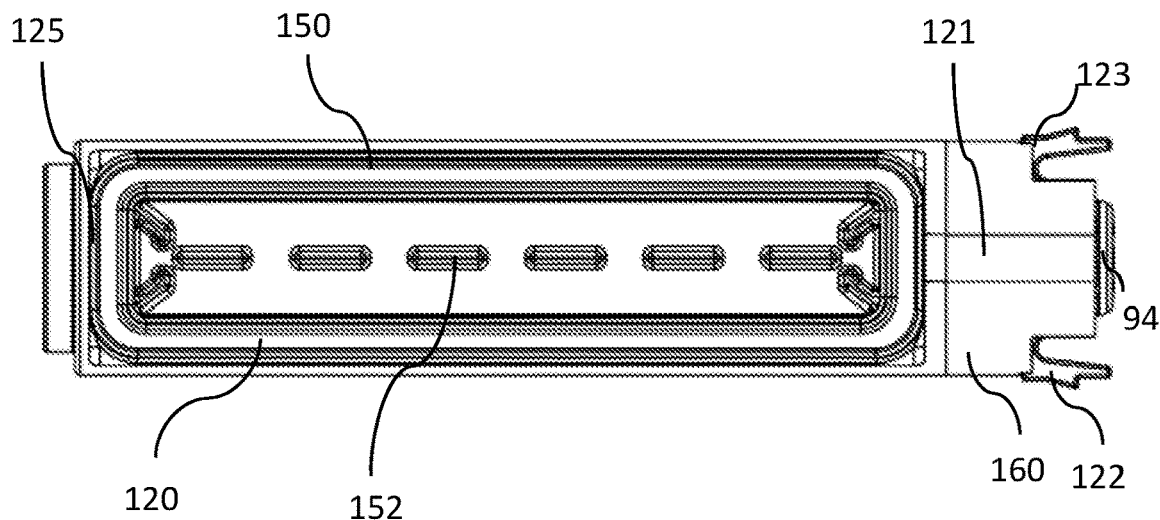
FIG. 38 shows a top view of the compensating housing of FIG. 35.
Figure 39:
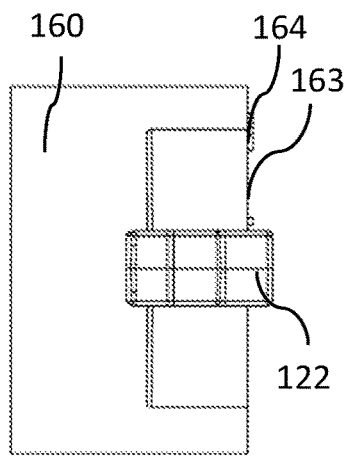
FIG. 39 shows a side view of the indicator section of the compensating housing of FIG. 35.
Figure 40:
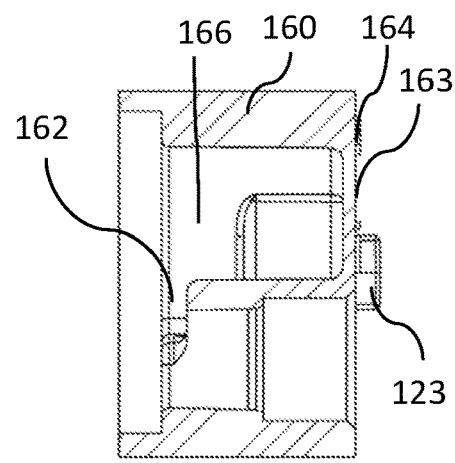
FIG. 40 shows a sectional view of the indicator section of FIG. 39 corresponding to the sectional plane of FIG. 37.
Figure 41:
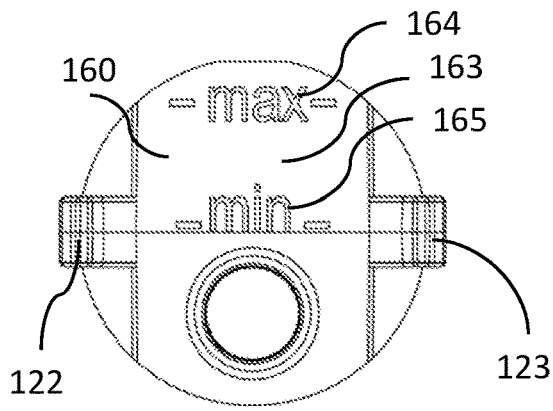
FIG. 41 shows a view of the indicator section of FIG. 39 seen from the handlebar end.
Figure 42:
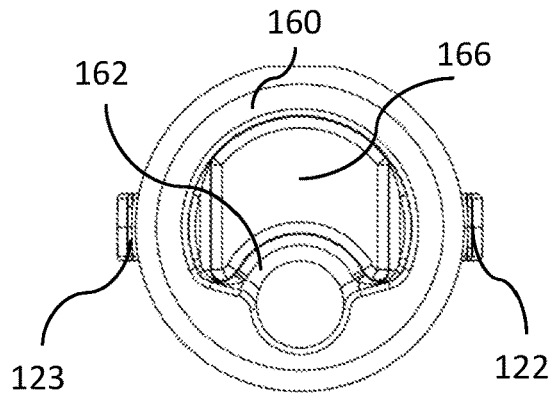
FIG. 42 shows a view of the indicator section of FIG. 39 seen from the compensating section of the compensating housing.
Figure 43:
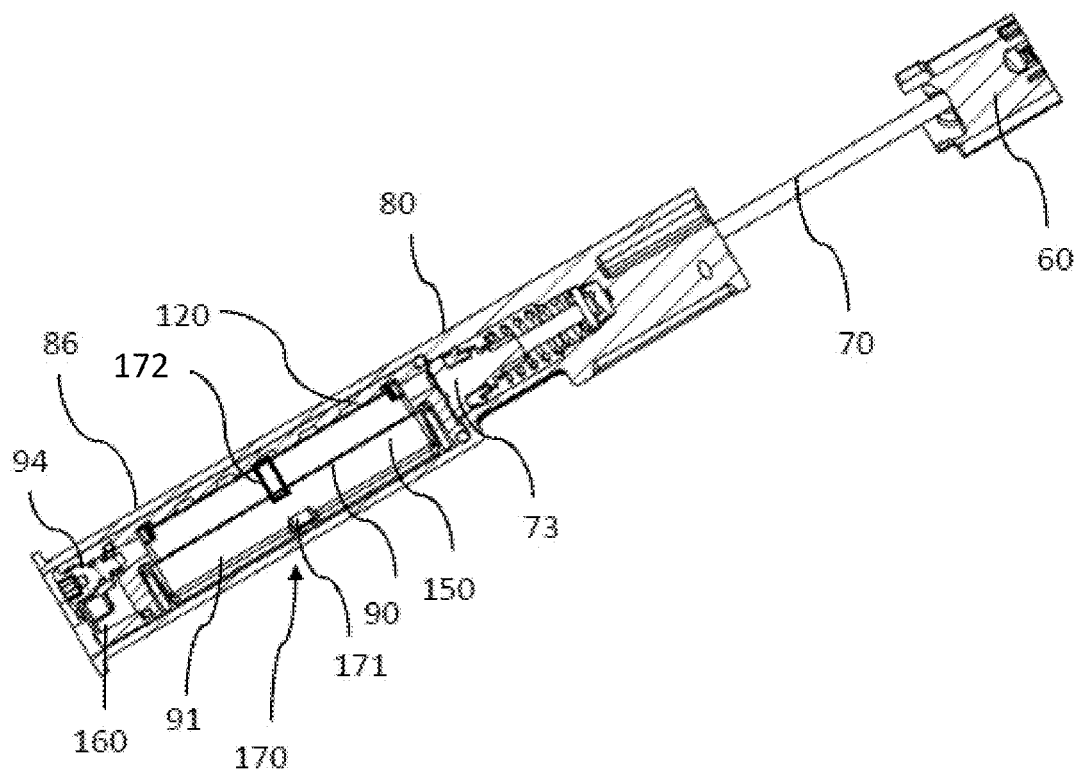
FIG. 43 shows a sectional view of a hydraulic master apparatus having a compensating housing according to FIGS. 35 to 42 for installation in a handlebar tube of a handlebar-guided vehicle, the section running in accordance with the sectional plane of FIG. 37.
Figure 44:
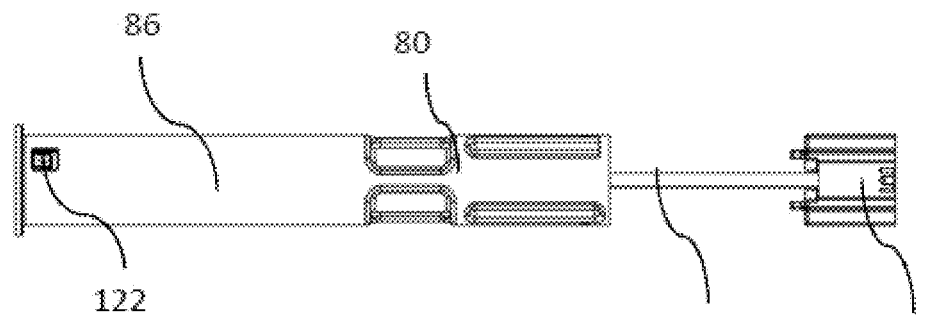
FIG. 44 shows a side view of the hydraulic master apparatus of FIG. 43.
Figure 45:
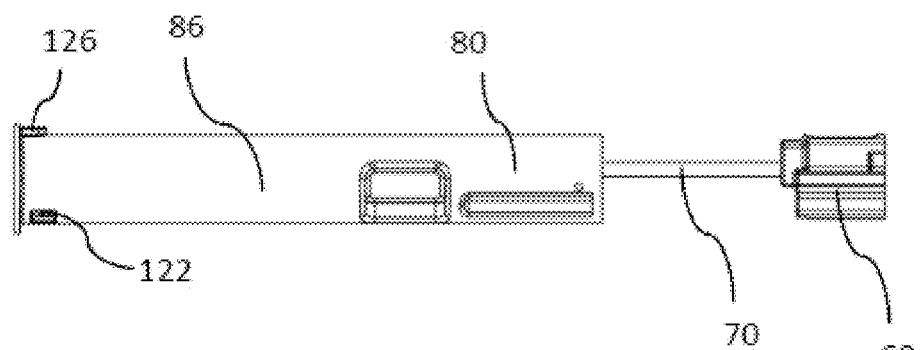
FIG. 45 shows a side view of the hydraulic master apparatus of FIG. 43.

The compensating housing 120 is designed in two parts. This has an advantage when using injection molding technology if a fill level indicator is to be provided at the handlebar end. Alternatively, the compensating housing 120 can also be designed in one piece with a filling level indicator at the handlebar end, if it can be manufactured economically using other manufacturing processes, such as rapid prototyping. The illustrated two-piece compensating housing has a compensating section 150 and an indicating section 160, which are connected to each other at the end faces. A seal 161 is provided in the transition area and can be designed as an O-ring, for example. A web 151 above the passage 93 is provided at the end face of the compensating section, as shown in FIG. 36.

The indicating section 160 is in fluid communication with the compensating section 150 via a passage 162 which is designed past the vent screw 94. As a result, the indicating section 160 in the area 166 is filled according to the filling level in the compensating section 150, so that the filling level can be read through the transparent front wall 163. For orientation or easy reading, markings 163 or 164 can be provided on the front wall 162, as in the embodiment, indicating, for example, that a maximum or minimum filling level has been reached.

At the bottom of the compensating container 150, projections 152 can be provided, on which the bellows 91 can rest when the hydraulic master apparatus is evacuated for filling, for example.

As an alternative or in addition to the optical level indicator in the indicating section 160 or the indicator 140 of the other embodiments, a sensor device 170 can also be provided to detect the filling level in the compensating chamber 90. For example, a magnet 171 can be provided on the bellows 91, the relative position of which is detected by a sensor 172. Depending on the filling level of the compensating chamber 90, the bellows 91 will sag. It is therefore advantageous to place the magnet 171 in the middle of the bellows in order to get to know a possible positional change depending on the filling level. The magnet can be arranged on the bellows 91 in a suitable way. For example, the magnet 171 can be accommodated in a pocket formed on the bellows. Alternatively, the magnet 171 can also be fixed to the bellows by encapsulating the bellows. Bonding or any other suitable fastening method is conceivable. Such a sensor device for recording the filling level of the compensating chamber can also be provided for the other embodiments.

The extension 86 is provided with the web 126 or a rib which can be arranged in a corresponding recess at the end of the handlebar tube to prevent rotation.

It goes without saying that the invention is not limited to the illustrated embodiments. Therefore, the above description should not be considered limiting but explanatory. The following claims should be understood in such a way that a stated feature is present in at least one embodiment of the invention. This does not exclude the presence of further features. If the claims and the above description define "first" and "second" embodiments, this designation serves to distinguish between two similar embodiments without determining a ranking order.

The invention claimed is:

1. A hydraulic master apparatus for a hydraulic brake or clutch of a handlebar-guided vehicle having a handlebar tube, the hydraulic master apparatus comprising:
the handlebar tube defining a longitudinal direction;
a support connected to the handlebar tube;
a hydraulic cylinder disposed in the handlebar tube and having a piston;
a lever pivotally connected to the support to move in an actuation direction towards the hydraulic cylinder;
a pulling device that is configured to exert a pulling force on the piston of the hydraulic cylinder when the lever is actuated in the actuation direction; and
a shifting device disposed in the handlebar tube and configured to be movable in the longitudinal direction of the handlebar tube.

2. The hydraulic master apparatus according to claim 1, wherein:
the hydraulic brake has an associated hydraulic slave apparatus and a hydraulic line; and
the pulling device defines a hydraulic channel extending from the hydraulic cylinder to the hydraulic line connected to the hydraulic slave apparatus.

3. The hydraulic master apparatus according to claim 1, wherein the shifting device is connected to the pulling device.

4. The hydraulic master apparatus according to claim 1, which further comprises a grip width adjusting apparatus, by which a distance between the support for the lever and the hydraulic cylinder is adjusted to adjust a grip width.

5. The hydraulic master apparatus according to claim 1, wherein the support is movably arranged on the handlebar tube.

6. The hydraulic master apparatus according to claim 1, wherein the pulling device comprises a pull rod.

7. The hydraulic master apparatus according to claim 6, wherein:
the hydraulic brake has an associated hydraulic slave apparatus and a hydraulic line; and
the pulling device defines a hydraulic channel extending from the hydraulic cylinder to the hydraulic line connected to the hydraulic slave apparatus.

8. The hydraulic master apparatus according to claim 1, which further comprises two arms pivotally connected to the lever to hinge the lever at two axes of rotation.

9. The hydraulic master apparatus according to claim 8, which further comprises a pressure piece and one of the two arms is part of the pressure piece.

10. The hydraulic master apparatus according to claim 1, wherein the hydraulic cylinder has an operative state and an inoperative state and, in the inoperative state, the hydraulic cylinder is configured to move within the handlebar tube.

11. The hydraulic master apparatus according to claim 10, wherein the pulling device is adjustable.

12. The hydraulic master apparatus according to claim 1, which further comprises a cover that, responsive to being connected in the handlebar tube, defines with the hydraulic cylinder in the handlebar tube a compensating chamber therebetween.

13. The hydraulic master apparatus according to claim 12, wherein the hydraulic cylinder is disposed between the support for the lever and the compensating chamber.

14. A hydraulic master apparatus for a hydraulic brake or clutch of a handlebar-guided vehicle having a handlebar tube, the hydraulic master apparatus comprising:
the handlebar tube defining a longitudinal direction;
a support connected to the handlebar tube;
a hydraulic cylinder disposed in the handlebar tube and having a piston;
a lever pivotally connected to the support to move in an actuation direction towards the hydraulic cylinder;
a pulling device configured to exert a pulling force on the piston of the hydraulic cylinder when the lever is actuated in the actuation direction;
a grip width adjusting apparatus, by which a distance between the support for the lever and the hydraulic cylinder is adjusted to adjust a grip width; and
a shifting device connected to the pulling device, disposed in the handlebar tube, and configured to be movable in the longitudinal direction of the handlebar tube.

15. The hydraulic master apparatus according to claim 14, wherein the support is movably arranged on the handlebar tube.

16. The hydraulic master apparatus according to claim 14, which further comprises a cover that, responsive to being connected in the handlebar tube, defines with the hydraulic cylinder in the handlebar tube a compensating chamber therebetween.

17. The hydraulic master apparatus according to claim 14, wherein the hydraulic cylinder has an operative state and an inoperative state and, in the inoperative state, the hydraulic cylinder is configured to move within the handlebar tube.

18. The hydraulic master apparatus according to claim 17, wherein the pulling device is adjustable.

* * * * *